United States Patent
Day

(10) Patent No.: US 12,072,713 B1
(45) Date of Patent: *Aug. 27, 2024

(54) ROBOTIC VACUUM WITH MOBILE SECURITY FUNCTION

(71) Applicant: Ambarella International LP, Santa Clara, CA (US)

(72) Inventor: Christopher N Day, Los Gatos, CA (US)

(73) Assignee: Ambarella International LP, Santa Clara, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 17/733,492

(22) Filed: Apr. 29, 2022

Related U.S. Application Data

(63) Continuation of application No. 16/437,256, filed on Jun. 11, 2019, now Pat. No. 11,416,002.

(51) Int. Cl.
| | |
|---|---|
| *G05D 1/00* | (2024.01) |
| *A47L 11/40* | (2006.01) |
| *G06V 40/16* | (2022.01) |
| *H04N 7/18* | (2006.01) |

(52) U.S. Cl.
CPC ........ *G05D 1/0246* (2013.01); *A47L 11/4061* (2013.01); *G05D 1/0219* (2013.01); *G05D 1/0238* (2013.01); *G06V 40/172* (2022.01); *H04N 7/185* (2013.01); *A47L 2201/04* (2013.01)

(58) Field of Classification Search
CPC .. G05D 1/0246; G05D 1/0219; G05D 1/0238; G05D 2201/0215; A47L 11/4061; A47L 2201/04; G06V 40/172; H04N 7/185
See application file for complete search history.

(56) References Cited

U.S. PATENT DOCUMENTS

| | | | | |
|---|---|---|---|---|
| 4,790,402 A | * | 12/1988 | Field ................... | G05D 1/0244 701/25 |
| 4,797,557 A | * | 1/1989 | Ohman ................. | G01S 5/16 901/47 |
| 4,933,864 A | * | 6/1990 | Evans, Jr. ............ | G05D 1/0253 318/587 |
| 5,006,988 A | * | 4/1991 | Borenstein ........... | G05D 1/0255 701/25 |
| 5,040,116 A | * | 8/1991 | Evans, Jr. ............ | G05D 1/0246 701/28 |

(Continued)

*Primary Examiner* — Bhavesh V Amin
(74) *Attorney, Agent, or Firm* — Maiorana Patent Law, PA

(57) ABSTRACT

An apparatus includes a video capture device and a processor. The video capture device may be mounted at a low position. The video capture device may be configured to generate a plurality of video frames that capture a field of view upward from the low position. The processor may be configured to perform video operations to generate dewarped frames from the video frames and detect objects in the dewarped frames, extract data about the objects based on characteristics of the objects determined using said video operations, perform path planning in response the extracted data and generate a video stream based on the dewarped frames. The video operations may generate the dewarped frames to correct a distortion effect caused by capturing the video frames from the low position. The path planning may be used to move the apparatus to a new location. The apparatus may be capable of autonomous movement.

20 Claims, 16 Drawing Sheets

(56) References Cited

U.S. PATENT DOCUMENTS

| | | | | |
|---|---|---|---|---|
| 5,130,794 A * | 7/1992 | Ritchey | | H04N 13/38 |
| | | | | 348/E13.052 |
| 5,684,695 A * | 11/1997 | Bauer | | G05D 1/0274 |
| | | | | 701/28 |
| 6,292,713 B1 * | 9/2001 | Jouppi | | G06F 3/011 |
| | | | | 715/733 |
| 6,496,754 B2 * | 12/2002 | Song | | G01S 17/931 |
| | | | | 700/145 |
| 7,340,100 B2 * | 3/2008 | Higaki | | G06F 3/017 |
| | | | | 382/199 |
| 7,467,026 B2 * | 12/2008 | Sakagami | | B25J 9/1694 |
| | | | | 700/250 |
| 7,551,980 B2 * | 6/2009 | Sakagami | | G05D 1/0251 |
| | | | | 446/175 |
| 7,593,546 B2 * | 9/2009 | Jouppi | | H04N 7/15 |
| | | | | 382/153 |
| 7,627,386 B2 * | 12/2009 | Mo | | G01S 7/5206 |
| | | | | 600/443 |
| 7,702,420 B2 * | 4/2010 | Goto | | G05D 1/12 |
| | | | | 700/250 |
| 7,706,917 B1 * | 4/2010 | Chiappetta | | H02J 50/10 |
| | | | | 700/258 |
| 8,027,761 B1 * | 9/2011 | Nelson | | G01S 5/18 |
| | | | | 701/50 |
| 8,049,902 B2 * | 11/2011 | Senoo | | G05D 1/0253 |
| | | | | 356/614 |
| 9,479,732 B1 * | 10/2016 | Saleh | | H04N 7/142 |
| 9,495,876 B2 * | 11/2016 | Lu | | B60W 30/09 |
| 9,751,210 B2 * | 9/2017 | Fong | | B25J 9/1602 |
| 10,106,155 B2 * | 10/2018 | Lu | | B62D 15/0295 |
| 10,471,611 B2 * | 11/2019 | Dooley | | H04N 23/631 |
| 10,875,526 B2 * | 12/2020 | Lu | | G08G 1/168 |
| 11,022,976 B2 * | 6/2021 | Xiao | | G05D 1/0219 |
| 11,416,002 B1 * | 8/2022 | Day | | H04N 7/185 |
| 11,518,377 B2 * | 12/2022 | Lu | | B60W 30/09 |
| 11,662,743 B2 * | 5/2023 | Karapetyan | | G05D 1/0272 |
| | | | | 700/245 |
| 2001/0037163 A1 * | 11/2001 | Allard | | B25J 9/1689 |
| | | | | 700/245 |
| 2003/0216834 A1 * | 11/2003 | Allard | | B25J 9/1689 |
| | | | | 700/245 |
| 2003/0229474 A1 * | 12/2003 | Suzuki | | G08B 25/009 |
| | | | | 702/188 |
| 2004/0019406 A1 * | 1/2004 | Wang | | H04N 7/185 |
| | | | | 700/231 |
| 2004/0111273 A1 * | 6/2004 | Sakagami | | G06Q 99/00 |
| | | | | 704/277 |
| 2004/0113777 A1 * | 6/2004 | Matsuhira | | G08B 29/188 |
| | | | | 340/541 |
| 2004/0167667 A1 * | 8/2004 | Goncalves | | G05D 1/0231 |
| | | | | 700/250 |
| 2004/0202351 A1 * | 10/2004 | Park | | G05D 1/0234 |
| | | | | 382/104 |
| 2004/0221790 A1 * | 11/2004 | Sinclair | | G01P 3/36 |
| | | | | 356/4.03 |
| 2005/0022330 A1 * | 2/2005 | Park | | A47L 9/009 |
| | | | | 15/319 |
| 2005/0022485 A1 * | 2/2005 | Park | | F24F 8/10 |
| | | | | 55/385.1 |
| 2005/0071047 A1 * | 3/2005 | Okabayashi | | G06V 20/10 |
| | | | | 700/245 |
| 2005/0182518 A1 * | 8/2005 | Karlsson | | G06V 10/84 |
| | | | | 700/253 |
| 2005/0216124 A1 * | 9/2005 | Suzuki | | G05D 1/0272 |
| | | | | 700/253 |
| 2005/0216126 A1 * | 9/2005 | Koselka | | G08B 21/0461 |
| | | | | 901/2 |
| 2005/0237188 A1 * | 10/2005 | Tani | | G05D 1/0246 |
| | | | | 340/541 |
| 2005/0237189 A1 * | 10/2005 | Tani | | G05D 1/0246 |
| | | | | 340/541 |
| 2005/0237388 A1 * | 10/2005 | Tani | | G08B 13/19695 |
| | | | | 348/E7.086 |
| 2005/0278068 A1 * | 12/2005 | Hong | | G05D 1/0253 |
| | | | | 700/259 |
| 2006/0056677 A1 * | 3/2006 | Tani | | G05D 1/0246 |
| | | | | 382/153 |
| 2006/0217837 A1 * | 9/2006 | Koga | | G05D 1/12 |
| | | | | 700/259 |
| 2006/0293788 A1 * | 12/2006 | Pogodin | | G05D 1/0011 |
| | | | | 701/23 |
| 2007/0027579 A1 * | 2/2007 | Suzuki | | G05D 1/0274 |
| | | | | 700/245 |
| 2007/0046237 A1 * | 3/2007 | Lakshmanan | | F41H 7/005 |
| | | | | 318/568.11 |
| 2007/0061041 A1 * | 3/2007 | Zweig | | G05D 1/0261 |
| | | | | 700/245 |
| 2007/0142964 A1 * | 6/2007 | Abramson | | A47L 9/2894 |
| | | | | 700/245 |
| 2007/0217042 A1 * | 9/2007 | Kweon | | G02B 17/06 |
| | | | | 359/838 |
| 2008/0161969 A1 * | 7/2008 | Lee | | G05D 1/0225 |
| | | | | 318/568.12 |
| 2009/0189974 A1 * | 7/2009 | Deering | | G02B 27/0093 |
| | | | | 348/51 |
| 2010/0183422 A1 * | 7/2010 | Makela | | G01C 21/12 |
| | | | | 414/800 |
| 2012/0197439 A1 * | 8/2012 | Wang | | B25J 5/00 |
| | | | | 901/1 |
| 2012/0197464 A1 * | 8/2012 | Wang | | B25J 9/1697 |
| | | | | 701/28 |
| 2012/0265416 A1 * | 10/2012 | Lu | | B60W 30/09 |
| | | | | 348/148 |
| 2015/0172376 A1 * | 6/2015 | Park | | H04L 67/75 |
| | | | | 709/204 |
| 2015/0202771 A1 * | 7/2015 | Lee | | G05D 1/0212 |
| | | | | 901/1 |
| 2015/0256955 A1 * | 9/2015 | Hwang | | H04M 1/6008 |
| | | | | 381/56 |
| 2016/0144505 A1 * | 5/2016 | Fong | | G05D 1/0274 |
| | | | | 700/250 |
| 2017/0057500 A1 * | 3/2017 | Lu | | H04N 23/63 |
| 2017/0203446 A1 * | 7/2017 | Dooley | | B25J 19/023 |
| 2019/0054918 A1 * | 2/2019 | Lu | | B62D 15/0295 |
| 2021/0107474 A1 * | 4/2021 | Lu | | B60W 30/09 |
| 2022/0080592 A1 * | 3/2022 | Karapetyan | | G05D 1/0272 |
| 2023/0056791 A1 * | 2/2023 | Kim | | A47L 11/4061 |

* cited by examiner

ROBOTIC VACUUM WITH MOBILE SECURITY FUNCTION

This application relates to U.S. application Ser. No. 16/437,256, filed on Jun. 11, 2019, which is hereby incorporated by reference in its entirety.

FIELD OF THE INVENTION

The invention relates to security devices generally and, more particularly, to a method and/or apparatus for implementing a robotic vacuum with mobile security function.

BACKGROUND

Most video surveillance devices are stationary. A stationary camera is only capable of capturing video of a dedicated location. Some stationary cameras can pivot back-and-forth automatically to capture a wider range of view, but are still limited to a single location. Even if a stationary camera is well-positioned, the video feed captured will only be from a single perspective, which can result in blind spots. Using multiple stationary cameras increases costs and still only provide limited perspectives.

Drones that implement a camera can provide mobile surveillance. However, drones have limited usefulness in an indoor environment. Drones do not operate discreetly because of the noise created by the propellers. Furthermore, a mobile surveillance device, such a drone, aesthetically does not fit with an indoor environment, and provides only a single functionality of surveillance.

It would be desirable to implement a robotic vacuum with mobile security function.

SUMMARY

The invention concerns an apparatus comprising a video capture device and a processor. The video capture device may be mounted at a low position. The video capture device may be configured to generate a plurality of video frames that capture a field of view upward from the low position. The processor may be configured to perform video operations to generate dewarped frames from the video frames and detect objects in the dewarped frames, extract data about the objects based on characteristics of the objects determined using said video operations, perform path planning in response the extracted data and generate a video stream based on the dewarped frames. The video operations may generate the dewarped frames to correct a distortion effect caused by capturing the video frames from the low position. The path planning may be used to move the apparatus to a new location. The apparatus may be capable of autonomous movement.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a robotic vacuum with mobile security function that may (i) perform housecleaning operations, (ii) use video analysis for path planning, object avoidance and surveillance, (iii) provide a surveillance perspective that can be modified in real-time, (iv) react to an audio event, (v) playback an audio message in response to objects detected, (vi) move to a location of an event, (vii) dewarp captured video frames to perform a perspective correction and/or (viii) be implemented as one or more integrated circuits.

Embodiments of the present invention may implement an autonomous mobile device configured to perform video surveillance and other functionality. The invention may be implemented as a robotic vacuum cleaner having integrated camera systems. The camera systems may have dual functionality. The camera systems may be configured to enable the robotic vacuum cleaner to perform autonomous navigation (e.g., avoid obstacles, recognize objects and/or assist with path planning). The camera system may be further utilized to enable the robotic vacuum cleaner to operate as a mobile security camera.

Figure 1:
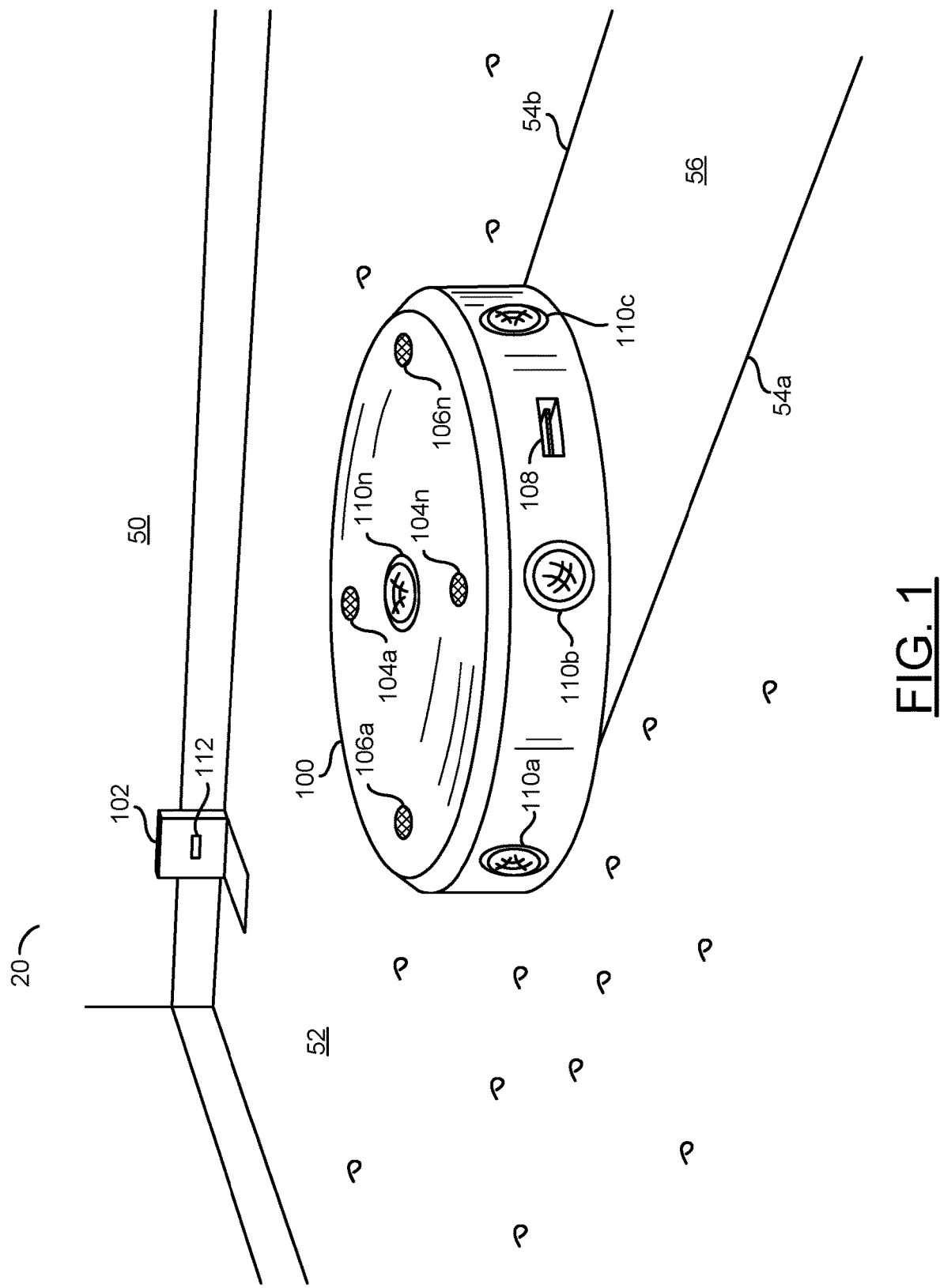
FIG. 1 is a diagram illustrating an example embodiment of the present invention.

Referring to FIG. 1, a diagram illustrating an example embodiment of the present invention is shown. A room 20 is shown. The room 20 may be an interior environment (e.g., a home, an office, a place of business, a factory, etc.). A wall 50, a floor section 52, lines 54a-54b and a floor section 56 are shown as part of the room 20. The floor section 52 may be an uncleaned area of a floor. The uncleaned floor area 52 is shown having particles (e.g., dirt, debris, dust, etc.). The lines 54a-54b may represent a transition between the floor section 52 and the floor section 56. The floor section 56 may be a cleaned area of the floor. The cleaned floor area 56 is shown without having particles.

An apparatus (or device, or module) 100 is shown in the room 20. The apparatus 100 may be a representative example embodiment of the present invention. The apparatus 100 may be configured to perform services (e.g., housecleaning services). The apparatus 100 may be configured to perform video surveillance. The apparatus 100 may be an autonomously moving device configured to perform multiple functions (e.g., housecleaning and video surveillance). In the example shown, the apparatus 100 may be implemented as a robotic vacuum cleaner.

The apparatus 100 may be configured to autonomously move around the room 20 and clean the floor 52. The apparatus 100 may be powered internally (e.g., battery powered and not tethered to a power supply). For example, the apparatus 100 may be configured to travel to and on the uncleaned floor area 52. The apparatus 100 may be configured to clean (e.g., vacuum debris from) the uncleaned floor area 52. For example, after traveling on and cleaning the uncleaned floor area 52, the floor may become the cleaned floor area 56. The lines 54a-54b may represent a path traveled by the apparatus 100 in the uncleaned floor area 52 that leaves behind the cleaned floor area 56 as a trail.

A device (or circuit or module) 102 is shown in the room 20. The device 102 may implement a docking station for the apparatus 100. The docking station 102 may be configured to re-charge the apparatus 100. The re-charging performed by the docking station 102 may enable the apparatus 100 to roam without being tethered to a power source. The docking station 102 is shown attached to the wall 50. In an example, the docking station 102 may be connected to a power supply (e.g., an electrical outlet on the wall 50).

The apparatus 100 may be a mobile device comprising speakers 104a-104n, microphones 106a-106n, a port 108 and/or lenses 110a-110n. The speakers may enable the apparatus 100 to playback audio messages. The microphones 106a-106n may be configured to capture directional audio. The port 108 may enable the apparatus 100 to connect to the docking station 102 to re-charge. The lenses 110a-110n may be configured to receive visual input. Details of the speakers 104a-104n, the microphones 106a-106n and/or the lenses 110a-110n may be described in association with FIG. 3.

The lenses 110a-110n may be mounted to the mobile apparatus 100 (e.g., mounted on a housing that operates as a mobile unit). The lenses 110a-110n are shown arranged on the apparatus 100. In the example shown, some of the lenses 110a-110n are shown mounted along a circular edge of the apparatus 100. In the example shown, one of the lenses 110a-110n is mounted on a top of the apparatus 100. In some embodiments, the multiple lenses 110a-110n may be arranged on the apparatus 100 to enable capturing video data all around the apparatus 100 (e.g., to provide a full 360 degree field of view of video data that may be stitched together). In some embodiments, one or more of the lenses 110a-110n may be wide-angle (e.g., fisheye) lenses that provide a wide angle field of view (e.g., a 360 degree field of view) to enable capturing video data on all sides of the apparatus 100. In some embodiments, the lenses 110a-110n may be mounted on one side of the apparatus 100 (e.g., on a front side to enable capturing video data for a forward view for the direction of travel). The arrangement of the lenses 110a-110n and/or the type of view provided by the lenses 110a-110n may be varied according to the design criteria of a particular implementation.

The apparatus 100 may be configured to operate as a mobile security camera. The apparatus 100 may perform a housecleaning functionality by moving about a home (or building) to vacuum while providing surveillance operations. The apparatus 100 may be configured to travel to different rooms within a premises. For example, the apparatus 100 may move into rooms that may lack security cameras. The apparatus 100 may be configured to move to different areas of a room to provide alternate perspectives for video data acquisition. For example, the apparatus 100 may move to locations to capture video of an area that may be hidden from view in video captured by a fixed position camera.

Generally, the apparatus 100 may autonomously move about the room 20 to perform the housecleaning functions and/or capture video data. The apparatus 100 may operate according to a schedule and/or in response to debris detected using the lenses 110a-110n to autonomously clean the room 20. In some embodiments, the apparatus 100 may perform the housecleaning functionality until an interruption is detected. In one example, the operation of the apparatus 100 as a mobile security camera may be initiated in response to particular events.

In some embodiments, the event that triggers the security camera functionality of the apparatus 100 may be detecting a noise. In one example, the microphones 106a-106n may detect audio such as breaking glass, which may trigger the video surveillance functionality of the apparatus 100. The microphones 106a-106n may be configured as a directional microphone arrangement that captures audio information to enable intelligent audio capabilities such as detecting a type of sound and directional information about the source of the sound. For example the microphones 106a-106n may provide directional information that the apparatus 100 may use to decide where to move to in order to capture video of the source of the audio.

In some embodiments, the event that triggers the security camera functionality of the apparatus 100 may be detections made by other types of input. In one example, motion (e.g., by a person or animal) may be detected by a networked PIR sensor, which may trigger the video surveillance functionality of the apparatus 100. In another example, the apparatus 100 may be configured to switch modes of operation in response to remote wireless control.

The apparatus 100 may be configured to move to the docking station 102. The docking station 102 is shown comprising a port 112. The apparatus 100 may move to the docking station 102 in order to connect the port 108 on the apparatus 100 to the port 112 on the docking station 102. The port 112 may provide a connection to a power source for charging the apparatus 100. In some embodiments, the port 108 may be configured to enable the apparatus 100 to unload debris collected while cleaning (e.g., the apparatus 100 may collect debris, drop off the debris at the docking station 102 and a person may empty out the debris from the docking station 102). In some embodiments, the port 108 may be configured to provide a network connection (e.g., a wired connection) to enable the apparatus 100 to upload captured video data.

The apparatus 100 may be configured to combine the functionality of an autonomous robotic vacuum with mobile security features. The apparatus 100 may implement video capture devices that may be used to enable computer vision for obstacle avoidance and/or path planning. The apparatus 100 may reuse the video capture devices to enable video surveillance (e.g., using both computer vision and/or providing a video stream to enable monitoring by a person). The apparatus 100 may employ wide-angle, fish-eye lenses 110a-110n in order to provide a wide field of view. The wide angle field of view may enable the apparatus 100 to operate both in near-field mode for obstacle avoidance, as well as at long range for surveillance operations.

Figure 2:
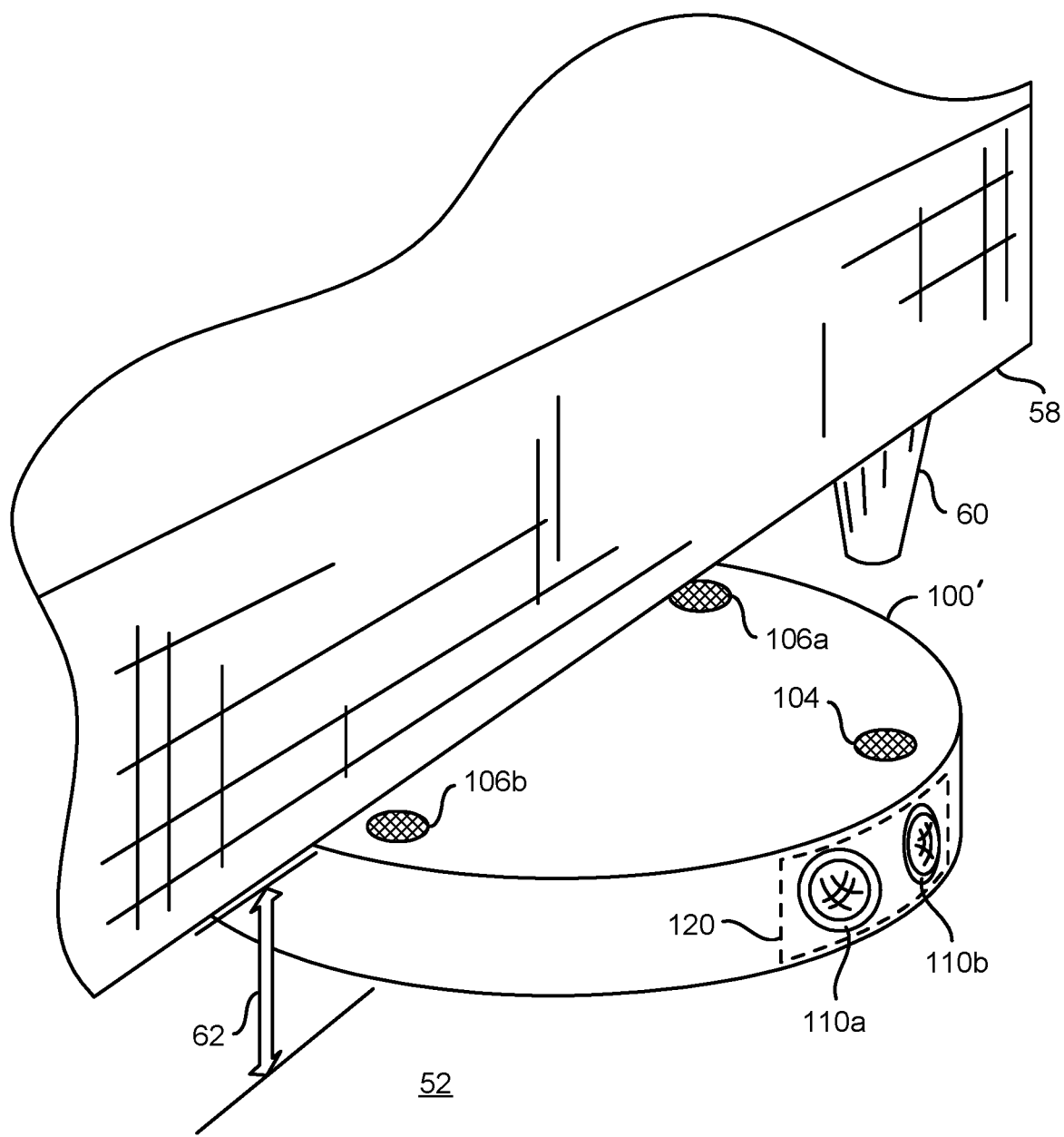
FIG. 2 is a diagram illustrating a low profile of a robotic vacuum cleaner.

Referring to FIG. 2, a diagram illustrating a low profile of a robotic vacuum cleaner is shown. The apparatus 100' is shown partially underneath a piece of furniture 58. In an example, the piece of furniture 58 may be a couch. The couch 58 is shown having a leg 60. An arrow 62 is shown. The arrow 62 may represent a gap between a bottom of the couch 58 and the floor 52. The leg 60 may create the gap 62 between the couch 58 and the floor 52.

The apparatus 100' may be implemented having a low profile. The low profile may enable the apparatus 100' to maneuver around and under objects such as furniture. The height of the apparatus 100' may be less than the size of the gap 62 to enable the apparatus 100' to move and clean underneath the couch 58.

The apparatus 100' is shown having the lenses 110a-110b on a front edge of the apparatus 100'. The lenses 110a-110b are shown as a stereo lens pair 120. The stereo lens pair 120 may be implemented to provide greater depth information than a single one of the lenses 110a-110n.

Due to the low profile of the apparatus 100', the camera lens pair 120 and/or the lenses 110a-110n will be low to the ground. The low profile of the lens pair 120 and/or the lenses 110a-110n may be problematic for capturing images while the apparatus 100' is in the mobile security camera mode. The field of view captured may be an upward view from a low position. The fish eye lens pair 120 and/or the fish eye lenses 110a-110n may have an advantage of providing a 360 degree field of view around the apparatus 100'. However, objects that are viewed from the low position become distorted by the fish eye lens pair 120 and/or the fisheye lenses 110a-110n.

The apparatus 100' may be configured to perform dewarping on images received from the wide angle lens pair 120 and/or the wide angle lenses 110a-110n. The dewarping performed by the apparatus 100' may be configured to reverse effects of geometric distortion, resulting from the upward view from the low position, in order to allow objects and/or people in the captured images to be seen with the correct (e.g., rectilinear) perspective. The dewarping of the image (s) received from the low position to correct the perspective may enable both computer vision operations to be performed and/or generate output that is comfortably interpreted by human vision.

The stereo lens pair 120 may be mounted at the low position of the apparatus 100. The apparatus 100 may be a device capable of autonomous movement. In one example, the apparatus 100 may comprise wheels. The wheels may be on a bottom side of the apparatus 100' touching the floor 52.

Figure 3:
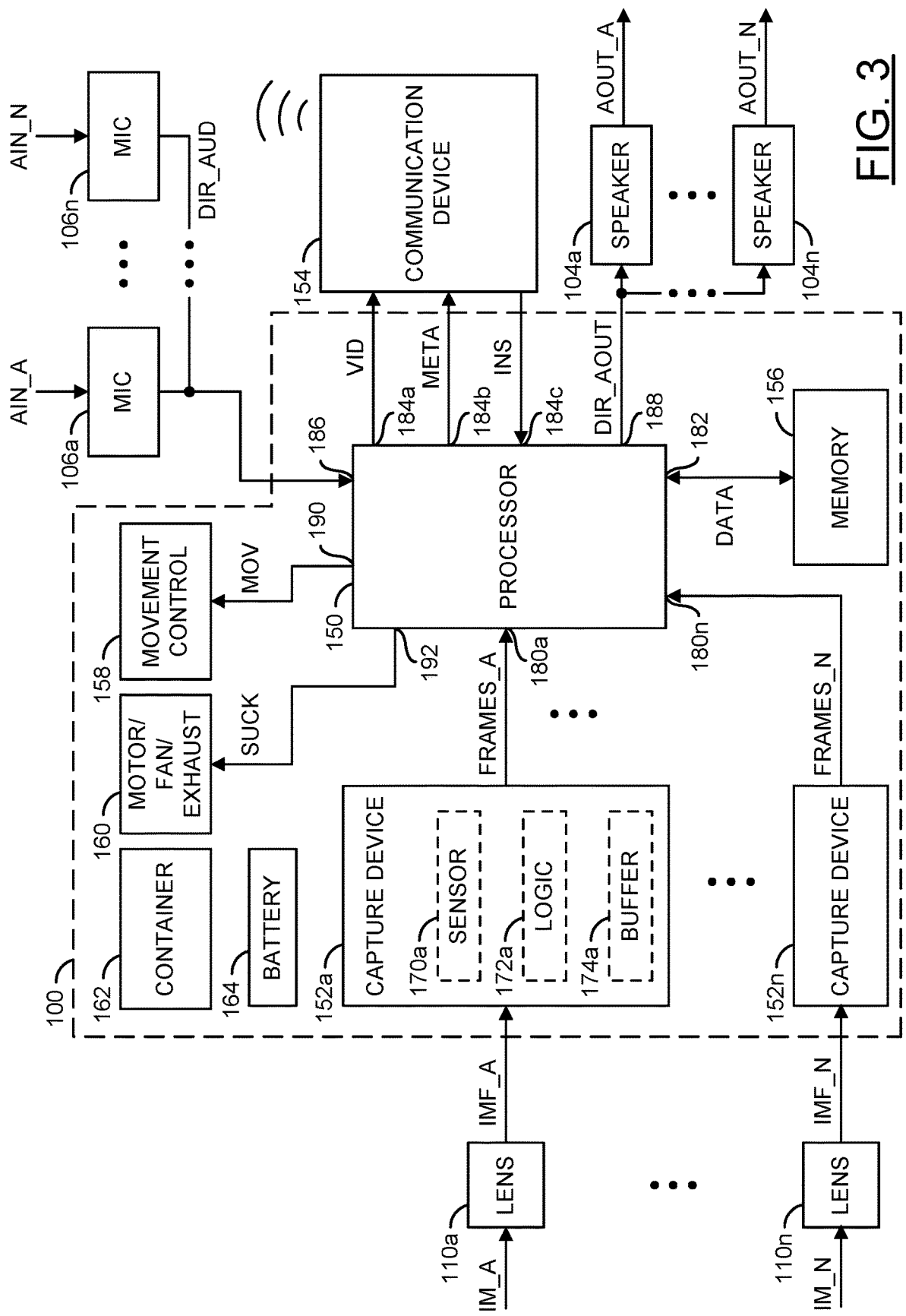
FIG. 3 is a block diagram illustrating an example embodiment of the present invention.

Referring to FIG. 3, a block diagram illustrating an example embodiment of the invention is shown. The apparatus 100 is shown. The apparatus 100 may be a representative example of the autonomous robotic vacuum cleaner and security device shown in association with FIG. 1 and FIG. 2. The apparatus 100 generally comprises the speakers 104a-104n, the microphones 106a-106n, the lenses 110a-110n, a block (or circuit) 150, blocks (or circuits) 152a-152n, a block (or circuit) 154, a block (or circuit) 156, a block (or circuit) 158, a block (or circuit) 160, a block 162 and/or a block (or circuit) 164. The circuit 150 may implement a processor. The circuits 152a-152n may implement capture devices. The circuit 154 may implement a communication device. The circuit 156 may implement a memory. The circuit 158 may implement a movement control module. The circuit 160 may implement a vacuum control module (e.g., including a motor, a fan, an exhaust, etc.). The block 162 may be a container. The circuit 164 may implement a battery. The apparatus 100 may comprise other components (not shown). The number, type and/or arrangement of the components of the apparatus 100 may be varied according to the design criteria of a particular implementation.

In an example implementation, the circuit 150 may be implemented as a video processor. The processor 150 may be configured to perform autonomous movement for the apparatus 100. The processor 150 may be configured to control and manage security features. The processor 150 may be configured to control and manage housekeeping features. The processor 150 may store and/or retrieve data from the memory 156. The memory 156 may be configured to store computer readable/executable instructions (or firmware). The instructions, when executed by the processor 150, may perform a number of steps.

Each of the capture devices 152a-152n may comprise a block (or circuit) 170, a block (or circuit) 172, and/or a block (or circuit) 174. The circuit 170 may implement a camera sensor (e.g., a complementary metal-oxide-semiconductor (CMOS) sensor). The circuit 172 may implement a camera processor/logic. The circuit 174 may implement a memory buffer. As a representative example, the capture device 152a is shown comprising the sensor 170a, the logic block 172a and the buffer 174a.

The processor 150 may comprise inputs 180a-180n and/or other inputs. The processor 150 may comprise an input/output 182. The processor 150 may comprise inputs 184a-184b and an output 184c. The processor 150 may comprise an input 186. The processor 150 may comprise an output 188. The processor 150 may comprise an output 190. The processor 150 may comprise an output 192 and/or other outputs. The number of inputs, outputs and/or bi-directional ports implemented by the processor 150 may be varied according to the design criteria of a particular implementation.

In the embodiment shown, the capture devices 152a-152n may be components of the apparatus 100. In one example, the capture devices 152a-152n may be implemented as part of an autonomous robot configured to patrol particular paths such as hallways. Similarly, in the example shown, the wireless communication device 154, the microphones 106a-106n and/or the speakers 104a-104n are shown external to the apparatus 100 but in some embodiments may be a component of the apparatus 100. Similarly, in the example shown, the movement control module 158, the vacuum control module 160, the container 160 and/or the battery 164 are shown internal to the apparatus 100 but in some embodiments may be components external to the apparatus 100.

The apparatus 100 may receive one or more signals (e.g., IMF_A-IMF_N), one or more signals (e.g., DIR_AUD) and/or a signal (e.g., INS). The apparatus 100 may present a signal (e.g., VID), a signal (e.g., META) and/or a signal (e.g., DIR_AOUT). The capture devices 152a-152n may receive the signals IMF_A-IMF_N from the corresponding lenses 110a-110n. The processor 150 may receive the signal DIR_AUD from the microphones 106a-106n. The processor 150 may present the signal VID and the signal META to the communication device 154. The processor 150 may receive the signal INS from the communication device 154. For example, the wireless communication device 154 may be a radio-frequency (RF) transmitter. In another example, the communication device 154 may be a Wi-Fi module. In another example, the communication device 154 may be a device capable of implementing RF transmission, Wi-Fi, Bluetooth and/or other wireless communication protocols. The processor 150 may present the signal DIR_AOUT to the speakers 104a-104n.

The lenses 110a-110n may capture signals (e.g., IM_A-IM_N). The signals IM_A-IM_N may be an image (e.g., an analog image) of the environment near the camera system 100 that are presented by the lenses 110a-110n to the capture devices 152a-152n as the signals IMF_A-IMF_N. The lenses 110a-110n may be implemented as an optical lens. The lenses 110a-110n may provide a zooming feature and/or a focusing feature. The capture devices 152a-152n and/or the lenses 110a-110n may be implemented, in one example, as a single lens assembly. In another example, the lenses 110a-110n may be a separate implementation from the capture devices 152a-152n. The capture devices 152a-152n are shown within the circuit 100. In an example implementation, the capture devices 152a-152n may be implemented outside of the circuit 100 (e.g., along with the lenses 110a-110n as part of a lens/capture device assembly).

The capture devices 152a-152n may be configured to capture image data for video (e.g., the signals IMF_A-IMF_N from the lenses 110a-110n). In some embodiments, the capture devices 152a-152n may be video capturing devices such as cameras. The capture devices 152a-152n may capture data received through the lenses 110a-110n to generate bitstreams (e.g., generate video frames). For example, the capture devices 152a-152n may receive focused light from the lenses 110a-110n. The lenses 110a-110n may be directed, tilted, panned, zoomed and/or rotated to provide a targeted view from the camera system 100 (e.g., to provide coverage for a panoramic field of view such as the field of view 102a-102b). The capture devices 152a-152n may generate signals (e.g., FRAMES_A-FRAMES_N). The signals FRAMES_A-FRAMES_N may be video data (e.g., a sequence of video frames). The signals FRAMES_A-FRAMES_N may be presented to the inputs 180a-180n of the processor 150.

The capture devices 152a-152n may transform the received focused light signals IMF_A-IMF_N into digital data (e.g., bitstreams). In some embodiments, the capture devices 152a-152n may perform an analog to digital conversion. For example, the capture devices 152a-152n may perform a photoelectric conversion of the focused light received by the lenses 110a-110n. The capture devices 152a-152n may transform the bitstreams into video data, video files and/or video frames. In some embodiments, the video data generated by the capture devices 152a-152n may be uncompressed and/or raw data generated in response to the focused light from the lenses 110a-110n. In some embodiments, the video data may be digital video signals. The video signals may comprise video frames.

In some embodiments, the video data may be encoded at a high bitrate. For example, the signal may be generated using a lossless compression and/or with a low amount of lossiness. The apparatus 100 may encode the video data captured by the capture devices 152a-152n to generate the signal COMM.

The communication device 154 may send and/or receive data to/from the apparatus 100. In some embodiments, the communication device 154 may be implemented as a wireless communications module. In some embodiments, the communication device 154 may be implemented as a satellite connection to a proprietary system. In one example, the communication device 154 may be a hard-wired data port (e.g., a USB port, a mini-USB port, a USB-C connector, HDMI port, an Ethernet port, a DisplayPort interface, a Lightning port, etc.). In another example, the communication device 154 may be a wireless data interface (e.g., Wi-Fi, Bluetooth, ZigBee, cellular, etc.).

The processor 150 may receive the signals FRAMES_A-FRAMES_N from the capture devices 152a-152n at the inputs 180a-180n. The processor 150 may send/receive a signal (e.g., DATA) to/from the memory 156 at the input/output 182. The processor 150 may send the signal VID and/or the signal META to the communication device 154. The processor 150 may receive the signal DIR_AUD from the microphones 106a-106n. The processor 150 may send the signal DIR_AOUT to the speakers 104a-104n. The processor 150 may send a signal (e.g., MOV) to the movement control module 158. The processor 150 may send a signal (e.g., SUCK) to the vacuum control module 160. In an example, the processor 150 may be connected through a bi-directional interface (or connection) to the speakers 104a-104n, the microphones 106a-106n, the capture devices 152a-152n, the communication device 154, the memory 156, the movement control module 158 and/or the vacuum control module 160.

The signal FRAMES_A-FRAMES_N may comprise video data (e.g., one or more video frames) providing a field of view captured by the lenses 110a-110n. The processor 150 may be configured to generate the signal VID, the signal META, the signal DIR_AOUT and/or other signals (not shown). The signal VID, the signal META and/or the signal DIR_AOUT may each be generated based on one or more decisions made and/or functions performed by the processor 150. The decisions made and/or functions performed by the processor 150 may be determined based on data received by the processor 150 at the inputs 180a-180n (e.g., the signals FRAMES_A-FRAMES_N), the input 182, the input 184c, the input 186 and/or other inputs.

The inputs 180a-180n, the input/output 182, the input/outputs 184a-184c, the input 186, the output 188, the output 190, the output 192 and/or other inputs/outputs may implement an interface. The interface may be implemented to transfer data to/from the speakers 104a-104n, the microphones 106a-106n, the processor 150, the capture devices 152a-152n, the communication device 154, the memory 156, the movement control module 158, the vacuum control 160 and/or other components of the apparatus 100. In one example, the interface may be configured to receive (e.g., via the inputs 180a-180n) the video streams FRAMES_A-FRAMES_N each from a respective one of the capture devices 152a-152n. In another example, the interface may be configured to receive (e.g., via the input 186) the directional audio DIR_AUD. In yet another example, the interface (via the ports 184a-184c) may be configured to transmit video data (e.g., the signal VID) and/or the converted data determined based on the computer vision operations (e.g., the signal META) to the communication device 154 and receive instructions (e.g., the signal INS) from the communication device 154. In still another example, the interface may be configured to transmit directional audio output (e.g., the signal DIR_AOUT) to each of the speakers 104a-104n. In another example, the interface (via the output 190) may be configured to transmit movement control instructions (e.g., the signal MOV) to the movement control module 158. In yet another example, the interface (via the output 192) may be configured to transmit vacuum control instructions (e.g., the signal SUCK). The interface may be configured to enable transfer of data and/or translate data from one format to another format to ensure that the data transferred is readable by the intended destination component. In an example, the interface may comprise a data bus, traces, connectors, wires and/or pins. The implementation of the interface may be varied according to the design criteria of a particular implementation.

The signal VID may be presented to the communication device 154. In some embodiments, the signal VID may be an encoded, cropped, stitched and/or enhanced version of one or more of the signals FRAMES_A-FRAMES_N (e.g., the captured video frames). In an example, the signal VID may be a high resolution, digital, encoded, dewarped, stabilized, cropped, blended, stitched and/or rolling shutter effect corrected version of the signals FRAMES_A-FRAMES_N.

The signal META may be presented to the communication device 154. In some embodiments, the signal META may be a text message (e.g., a string of human readable characters). In some embodiments, the signal META may be a symbol that indicates an event or status (e.g., a fire symbol indicating a fire has been detected, a heart symbol indicating a health issue has been detected, a symbol of a person walking to indicate that a person has been detected, etc.). The signal META may be generated based on video analytics (e.g., computer vision operations) performed by the processor 150 on the video frames FRAMES_A-FRAMES_N. The processor 150 may be configured to perform the computer vision operations to detect objects and/or events in the video frames FRAMES_A-FRAMES_N. The objects and/or events detected by the computer vision operations may be converted to the human-readable format by the processor 150. The data from the computer vision operations that has been converted to the human-readable format may be communicated as the signal META.

In some embodiments, the signal META may be data generated by the processor 150 (e.g., video analysis results, speech analysis results, profile information of users, etc.) that may be communicated to a cloud computing service in order to aggregate information and/or provide training data for machine learning (e.g., to improve speech recognition, to improve facial recognition, improve path planning, map an area, etc.). The type of information communicated by the signal META may be varied according to the design criteria of a particular implementation. In an example, a cloud computing platform (e.g., distributed computing) may be implemented as a group of cloud-based, scalable server computers. By implementing a number of scalable servers, additional resources (e.g., power, processing capability, memory, etc.) may be available to process and/or store variable amounts of data. For example, the cloud computing service may be configured to scale (e.g., provision resources) based on demand. The scalable computing may be available as a service to allow access to processing and/or storage resources without having to build infrastructure (e.g., the provider of the apparatus 100 may not have to build the infrastructure of the cloud computing service).

The signal INS may comprise instructions communicated to the processor 150. The communication device 154 may be configured to connect to a network and receive input. The instructions in the signal INS may comprise control information (e.g., to enable the apparatus 100 to be moved by remote control). For example, the signal VID may be transmitted to a remote terminal (e.g., a security monitoring station, a smartphone app that streams video from the apparatus 100, etc.) and the remote terminal may enable a person to provide input that may be translated to movement data for The instructions in the signal the movement control module 158. INS may comprise software and/or firmware updates. The instructions in the signal INS may comprise activation/deactivation instructions for the vacuum control module 160 (e.g., when to suck up dirt and went to stop). The instructions in the signal INS may enable manually switching between a house cleaning mode of operation and a surveillance mode of operation. The type of information communicated using the signal INS may be varied according to the design criteria of a particular implementation.

The apparatus 100 may implement a camera system. In some embodiments, the camera system 100 may be implemented as a drop-in solution (e.g., installed as one component). In an example, the camera system 100 may be a device that may be installed as an after-market product (e.g., a retro-fit for a robotic vacuum, a retro-fit for a security system, etc.). In some embodiments, the apparatus 100 may be a component of a security system. The number and/or types of signals and/or components implemented by the camera system 100 may be varied according to the design criteria of a particular implementation.

The video data captured by the capture devices 152a-152n may be represented as the signals/bitstreams/data FRAMES_A-FRAMES_N (e.g., video signals). The capture devices 152a-152n may present the signals FRAMES_A-FRAMES_N to the inputs 180a-180n of the processor 150. The signals FRAMES_A-FRAMES_N may represent the video frames/video data. The signals FRAMES_A-FRAMES_N may be video streams captured by the capture devices 152a-152n. In some embodiments, the capture devices 152a-152n may be implemented in the camera system 100. In some embodiments, the capture devices 152a-152n may be configured to add to existing functionality to the camera system 100.

The camera sensors 170a-170n may receive light from the corresponding one of the lenses 110a-110n and transform the light into digital data (e.g., the bitstreams). In one example, the sensor 170a of the capture device 152a may receive light from the lens 110a. The camera sensor 170a of the capture device 152a may perform a photoelectric conversion of the light from the lens 110a. In some embodiments, the sensor 170a may be an oversampled binary image sensor. The logic 172a may transform the bitstream into a human-legible content (e.g., video data). For example, the logic 172a may receive pure (e.g., raw) data from the camera sensor 170a and generate video data based on the raw data (e.g., the bitstream). The memory buffer 174a may store the raw data and/or the processed bitstream. For example, the frame memory and/or buffer 174a may store (e.g., provide temporary storage and/or cache) one or more of the video frames (e.g., the video signal).

In some embodiments, the sensors 170a-170n may implement an RGB-InfraRed (RGB-IR) sensor. The sensors 170a-170n may comprise a filter array comprising a red filter, a green filter, a blue filter and a near-infrared (NIR) wavelength filter (e.g., similar to a Bayer Color Filter Array with one green filter substituted with the NIR filter). The sensors 170a-170n may operate as a standard color sensor and a NIR sensor. Operating as a standard color sensor and NIR sensor may enable the sensors 170a-170n to operate in various light conditions (e.g., day time and night time).

The microphones 106a-106n may be configured to capture incoming audio and/or provide directional information about the incoming audio. Each of the microphones 106a-106n may receive a respective signal (e.g., AIN_A-AIN_N). The signals AIN_A-AIN_N may be audio signals from the environment near the apparatus 100. For example, the signals AIN_A-AIN_N may be ambient noise in the environment and/or the audio 80 from people and/or pets. The microphones 106a-106n may be configured to generate the signal DIR_AUD in response to the signals AIN_A-AIN_N. The signal DIR_AUD may be a signal that comprises the audio data from the signals AIN_A-AIN_N. The signal DIR_AUD may be a signal generated in a format that provides directional information about the signals AIN_A-AIN_N.

The microphones 106a-106n may provide the signal DIR_AUD to the interface 186. The apparatus 100 may comprise the interface 186 configured to receive data (e.g., the signal DIR_AUD) from one or more of the microphones 106a-106n. In one example, data from the signal DIR_AUD presented to the interface 186 may be used by the processor 150 to determine the location of a source of the audio (e.g., a person, an item falling, a pet, etc.). In another example, the microphones 106a-106n may be configured to determine the location of incoming audio and present the location to the interface 186 as the signal DIR_AUD.

The number of microphones 106a-106n may be varied according to the design criteria of a particular implementation. The number of microphones 106a-106n may be selected to provide sufficient directional information about the incoming audio (e.g., the number of microphones 106a-106n implemented may be varied based on the accuracy and/or resolution of directional information acquired). In an example, 2 to 6 of the microphones 106a-106n may be implemented. In some embodiments, an audio processing component may be implemented with the microphones 106a-106n to process and/or encode the incoming audio signals AIN_A-AIN_N. In some embodiments, the processor 150 may be configured with on-chip audio processing. The microphones 106a-106n may capture audio of the environment. The apparatus 100 may be configured to synchronize the audio captured with the images captured by the capture devices 152a-152n.

The processor 150 may be configured to execute computer readable code and/or process information. The processor 150 may be configured to receive input and/or present output to the memory 156. The processor 150 may be configured to present and/or receive other signals (not shown). The number and/or types of inputs and/or outputs of the processor 150 may be varied according to the design criteria of a particular implementation.

The processor 150 may receive the signals FRAMES_A-FRAMES_N, the signal DIR_AUDIO, the signal INS and/or the signal DATA. The processor 150 may make a decision based on data received at the inputs 180a-180n, the input 182, the input 184c, the input 186 and/or other input. For example other inputs may comprise external signals generated in response to user input, external signals generated by the microphones 106a-106n and/or internally generated signals such as signals generated by the processor 150 in response to analysis of the signals FRAMES_A-FRAMES_N and/or objects detected in the signals FRAMES_A-FRAMES_N. The processor 150 may adjust the video data (e.g., crop, digitally move, physically move the camera sensor 170, etc.) of the signals FRAMES_A-FRAMES_N. The processor 150 may generate the signal VID, the signal META, the signal DIR_AOUT, the signal MOV and/or the signal SUCK in response data received by the inputs 180a-180n, the input 182, the input 184c, the input 186 and/or the decisions made in response to the data received by the inputs 180a-180n, the input 182, the input 184c and/or the input 186.

The signal VID, the signal META, the signal DIR_AOUT, the signal MOV and/or the signal SUCK may be generated to provide an output in response to the captured video frames (e.g., the signal FRAMES_A-FRAMES_N) and the video analytics performed by the processor 150. For example, the video analytics may be performed by the processor 150 in real-time and/or near real-time (e.g., with minimal delay). In one example, the signal VID may be a live (or nearly live) video stream.

Generally, facial recognition video operations performed by the processor 150 may correspond to the data received at the inputs 180a-180n, the input 182, the input 184c, the input 186 and/or enhanced (e.g., stabilized, corrected, cropped, downscaled, packetized, compressed, etc.) by the processor 150. For example, the facial recognition video operations may be performed in response to a stitched, corrected, stabilized, cropped and/or encoded version of the signals FRAMES_A-FRAMES_N. The processor 150 may further encode and/or compress the signals FRAMES_A-FRAMES_N to generate the signal COMM.

The cropping, downscaling, blending, stabilization, packetization, encoding, compression and/or conversion performed by the processor 150 may be varied according to the design criteria of a particular implementation. For example, the signal VID may be a processed version of the signals FRAMES_A-FRAMES_N configured to fit the target area to the shape and/or specifications of a playback device. For example, the remote devices (e.g., security monitors, smartphones, tablet computing devices, etc.) may be implemented for real-time video streaming of the signal VID received from the apparatus 100.

In some embodiments, the signal VID may be some view (or derivative of some view) captured by the capture devices 152a-152n. For example, the signal VID may comprise a portion of the panoramic video captured by the capture devices 152a-152n. In another example, the signal VID may be a video frame comprising the region of interest selected and/or cropped from the panoramic video frame by the processor 150. The signal VID may comprise a video frame having a smaller size than the panoramic video frames FRAMES_A-FRAMES_N. In some embodiments, the signal VID may provide a series of cropped and/or enhanced panoramic video frames that improve upon the view from the perspective of the camera system 100 (e.g., provides night vision, provides High Dynamic Range (HDR) imaging, provides more viewing area, highlights detected objects, provides additional data such as a numerical distance to detected objects, provides visual indicators for paths of a race course, etc.).

The memory 156 may store data. The memory 156 may be implemented as a cache, flash memory, DRAM memory, etc. The type and/or size of the memory 156 may be varied according to the design criteria of a particular implementation. The data stored in the memory 156 may correspond to a video file, a facial recognition database, user profiles, user permissions, an area map, locations of objects detected, etc.

The lenses 110a-110n (e.g., camera lenses) may be directed to provide a panoramic view and/or a stereo view from the camera system 100. The lenses 110a-110n may be aimed to capture environmental data (e.g., light). The lens 110a-110n may be configured to capture and/or focus the light for the capture devices 152a-152n. Generally, the camera sensor 170 is located behind each of the lenses 110a-110n. Based on the captured light from the lenses 110a-110n, the capture devices 152a-152n may generate a bitstream and/or video data.

Embodiments of the processor 150 may perform video stitching operations on the signals FRAMES_A-FRAMES_N. In one example, each of the video signals FRAMES_A-FRAMES_N may provide a portion of a panoramic view and the processor 150 may crop, blend, synchronize and/or align the signals FRAMES_A-FRAMES_N to generate the panoramic video frames. In some embodiments, the processor 150 may be configured to determine depth information from the stereo view captured by the stereo lens pair 120. In some embodiments, the processor 150 may be configured to perform electronic image stabilization (EIS). The processor 150 may perform dewarping on the signals FRAMES_A-FRAMES_N. The processor 150 may perform intelligent video analytics on the dewarped video frames FRAMES_A-FRAMES_N. The processor 150 may encode the signals FRAMES_A-FRAMES_N to a particular format.

In some embodiments, the cropped and/or enhanced portion of the video generated by the processor 150 may be sent to the output 184a (e.g., the signal VID). In one example, the signal VID may be an HDMI output. In another example, the signal VID may be a composite (e.g., NTSC) output (e.g., composite output may be a low-cost alternative to HDMI output). In yet another example, the signal VID may be a S-Video output. In some embodiments, the signal VID may be an output sent via interfaces such as USB, SDIO, Ethernet and/or PCIe. The portion of the panoramic video signal VID may be output to the wireless communication device 154.

The video generated by the processor 150 may also be used to implement a video having high-quality video in the region of interest. The video generated by the processor 150 may be used to implement a video that reduces bandwidth needed for transmission by cropping out the portion of the video that has not been selected by the intelligent video analytics and/or the directional audio signal DIR_AUD as the region of interest. To generate a high-quality, enhanced video using the region of interest, the processor 150 may be configured to perform encoding, blending, cropping, aligning and/or stitching.

The encoded video may be processed locally and discarded, stored locally and/or transmitted wirelessly to external storage and/or external processing (e.g., network attached storage, cloud storage, distributed processing, etc.). In one example, the encoded video may be stored locally by the memory 156. In another example, the encoded video may be stored to a hard-drive of a networked computing device. In yet another example, the encoded video may be transmitted wirelessly without storage. The type of storage implemented may be varied according to the design criteria of a particular implementation.

In some embodiments, the processor 150 may be configured to send analog and/or digital video out (e.g., the signal VID) to the video communication device 154. In some embodiments, the signal VID generated by the apparatus 100 may be a composite and/or HDMI output. The processor 150 may receive an input for the video signal (e.g., the signals FRAMES_A-FRAMES_N) from the CMOS sensor (s) 170a-170n. The input video signals FRAMES_A-FRAMES_N may be enhanced by the processor 150 (e.g., color conversion, noise filtering, auto exposure, auto white balance, auto focus, etc.).

In some embodiments, the video captured may be panoramic video that may comprise a large field of view generated by one or more lenses/camera sensors. One example of a panoramic video may be an equirectangular 360 video. Equirectangular 360 video may also be called spherical panoramas. Panoramic video may be a video that provides a field of view that is larger than the field of view that may be displayed on a device used to playback the video. For example, the field of view captured by the camera system 100 may be used to generate panoramic video such as a spherical video, a hemispherical video, a 360 degree video, a wide angle video, a video having less than a 360 field of view, etc.

Panoramic videos may comprise a view of the environment near the camera system 100. In one example, the entire field of view of the panoramic video may be captured at generally the same time (e.g., each portion of the panoramic video represents the view from the camera system 100 at one particular moment in time). In some embodiments (e.g., when the camera system 100 implements a rolling shutter sensor), a small amount of time difference may be present between some portions of the panoramic video. Generally, each video frame of the panoramic video comprises one exposure of the sensor (or the multiple sensors 170a-170n) capturing the environment near the camera system 100.

In some embodiments, the field of view 102a-102b may provide coverage for a full 360 degree field of view. In some embodiments, less than a 360 degree view may be captured by the camera system 100 (e.g., a 270 degree field of view, a 180 degree field of view, etc.). In some embodiments, the panoramic video may comprise a spherical field of view (e.g., capture video above and below the camera system 100). For example, the camera system 100 may move along the floor 52 and capture a spherical field of view of the area above the camera system 100. In some embodiments, the panoramic video may comprise a field of view that is less than a spherical field of view (e.g., the camera system 100 may be configured to capture areas above and the areas to the sides of the camera system 100 but nothing directly below). The implementation of the camera system 100 and/or the captured field of view may be varied according to the design criteria of a particular implementation.

In embodiments implementing multiple lenses, each of the lenses 110a-110n may be directed towards one particular direction to provide coverage for a full 360 degree field of view. In embodiments implementing a single wide angle lens (e.g., the lens 110a), the lens 110a may be located to provide coverage for the full 360 degree field of view (e.g., on the top of the camera system 100). In some embodiments, less than a 360 degree view may be captured by the lenses 110a-110n (e.g., a 270 degree field of view, a 180 degree field of view, etc.). In some embodiments, the lenses 110a-110n may move (e.g., the direction of the capture devices 152a-152n may be controllable). In some embodiments, one or more of the lenses 110a-110n may be configured to implement an optical zoom (e.g., the lenses 110a-110n may zoom in/out independent of each other).

In some embodiments, the apparatus 100 may be implemented as a system on chip (SoC). For example, the apparatus 100 may be implemented as a printed circuit board comprising one or more components (e.g., the capture devices 152a-152n, the processor 150, the communication device 154, the memory 156, the movement control module 158, etc.). The apparatus 100 may be configured to perform intelligent video analysis on the video frames of the dewarped, panoramic video. The apparatus 100 may be configured to crop and/or enhance the captured video.

In some embodiments, the processor 150 may be configured to perform sensor fusion operations. The sensor fusion operations performed by the processor 150 may be configured to analyze information from multiple sources (e.g., the capture devices 152a-152n, the microphones 106a-106n, external networked sensors, etc.). By analyzing various data from disparate sources, the sensor fusion operations may be capable of making inferences about the data that may not be possible from one of the data sources alone. For example, the sensor fusion operations implemented by the processor 150 may analyze video data (e.g., mouth movements of the people) as well as the speech patterns from the directional audio DIR_AUD. The disparate sources may be used to develop a model of a scenario to support decision making. For example, the processor 150 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 150 may implement convolutional neural network capabilities. The convolutional neural network capabilities may implement computer vision using deep learning techniques. The convolutional neural network capabilities may be configured to implement pattern and/or image recognition using a training process through multiple layers of feature-detection.

The signal DIR_AOUT may be an audio output. For example, the processor 150 may generate output audio based on information extracted from the video frames FRAMES_A-FRAMES_N. The signal DIR_AOUT may be determined based on an event and/or objects determined using the computer vision operations. In one example, the signal DIR_AOUT may comprise an audio message. In some embodiments, the signal DIR_AOUT may not be generated until an event has been detected by the processor 150 using the computer vision operations.

The signal DIR_AOUT may comprise directional and/or positional audio output information for the speakers 104a-104n. The speakers 104a-104n may receive the signal DIR_AOUT, process the directional and/or positional information and determine which speakers and/or which channels will play back particular audio portions of the signal DIR_AOUT. The speakers 104a-104n may generate the signals AOUT_A-AOUT_N in response to the signal DIR_AOUT. The signals AOUT_A-AOUT_N may be the audio message played. For example, the speakers 104a-104n may emit a pre-recorded message in response to a detected event. The signal DIR_AOUT may be a signal generated in a format that provides directional information for the signals AOUT_A-AOUT_N.

The number of speakers 104a-104n may be varied according to the design criteria of a particular implementation. The number of speakers 104a-104n may be selected to provide sufficient directional channels for the outgoing audio (e.g., the number of speakers 104a-104n implemented may be varied based on the accuracy and/or resolution of directional audio output). In an example, 1 to 6 of the speakers 104a-104n may be implemented. In some embodiments, an audio processing component may be implemented by the speakers 104a-104n to process and/or decode the output audio signals DIR_AOUT. In some embodiments, the processor 150 may be configured with on-chip audio processing. In some embodiments, the signal DIR_AOUT may playback audio received from the remote devices 54a-54n in order to implement a 2-way real-time audio communication.

The movement control module 158 may be configured to enable the apparatus 100 to move. The movement control module 158 may comprise hardware for movement (e.g., wheels and/or castors) and/or circuitry for controlling the movement (e.g., an electric motor, steering control, etc.). The movement control module 158 may enable the apparatus 100 to move from a current location to a new location. The movement control module 158 may enable the apparatus 100 to move forwards, backwards, turn, rotate, etc.

The processor 150 may be configured to provide the signal MOV to the movement control module 158. The output 190 may communicate the signal MOV from the processor 150 to the movement control module 158. The signal MOV may comprise instructions for the movement control module 158. The movement control module 158 may translate the instructions provided in the signal MOV into physical movement (e.g., causing wheels to rotate, turning wheels, etc.). The movement control module 158 may cause the apparatus 100 to move in response to the signal MOV. In some embodiments, the processor 150 may generate the signal MOV in response to computer vision operations performed by the processor 150. For example, the processor 150 may analyze the signals FRAMES_A-FRAMES_N to detect objects. The processor 150 may recognize an object (e.g., a table leg, furniture, people, etc.) as an obstacle. The processor 150 may generate the signal MOV to cause the movement control module 158 to move the apparatus 100 to avoid the obstacle. In some embodiments, the processor 150 may translate remote control movement input from the signal INS to movement instructions for the movement control module 158 in the signal MOV.

The vacuum control module 160 may be configured to enable the housekeeping features of the apparatus 100. The vacuum control module 160 may comprise components such as an electric motor, a fan, an exhaust, etc. The components of the vacuum control module 160 may cause suction that enables the apparatus 100 to suck in debris from the uncleaned floor section 52. The processor 150 may be configured to provide the signal SUCK to the vacuum control module 160. The vacuum control module 160 may be configured to activate or deactivate suction in response to the signal SUCK.

The container 162 may be a cavity built into the apparatus 100. The container 162 may be configured to hold debris captured by the apparatus 100. For example, the vacuum control module 160 may generate suction to pull in debris and the debris may be stored in the container 162. The container 162 may be emptied by a person. In some embodiments, the container 162 may be emptied to another storage location (e.g., a debris container that may be implemented by the docking station 102). In one example, the container 162 may be implemented without electrical connections. In another example, the container 162 may provide an input (not shown) to the processor 150 that provides an indication of how much capacity the container 162 has available (e.g., the processor 150 may move the apparatus 100 to the docking station 102 when the container 162 is full).

The battery 164 may be configured as a power source for the apparatus 100. The power supplied by the battery 164 may enable the apparatus 100 to move untethered (e.g., not attached to a cord). The power supplied by the battery 164 may enable the movement generated by the movement control module 158, the suction generated by the vacuum control module 160 and/or the various components of the apparatus 100 to have power (e.g., the capture device 152a-152n, the processor 150, the wireless communication device 154, etc.). The battery 164 may be rechargeable. For example, the battery 164 may be recharged when the apparatus 100 connects to the docking station 102 (e.g., the port 108 of the apparatus 100 may connect to the port 112 of the docking station 102 to enable a connection to a household power supply). In some embodiments, the battery 164 may provide an input (not shown) to the processor 150 that provides an indication of how much power is remaining in the battery 164 (e.g., the processor 150 may move the apparatus 100 to the docking station 102 to recharge when the battery 164 is low).

The processor 150 may be configured to perform multiple functions in parallel. The processor 150 may implement stereo processing, powerful computer vision processing and video encoding. The processor 150 may be adapted to perform path planning and control for the movement control module 158 and perform the security functionality by encoding, dewarping and performing computer vision operations on the video frames captured by the capture devices 152a-152n.

Figure 4:
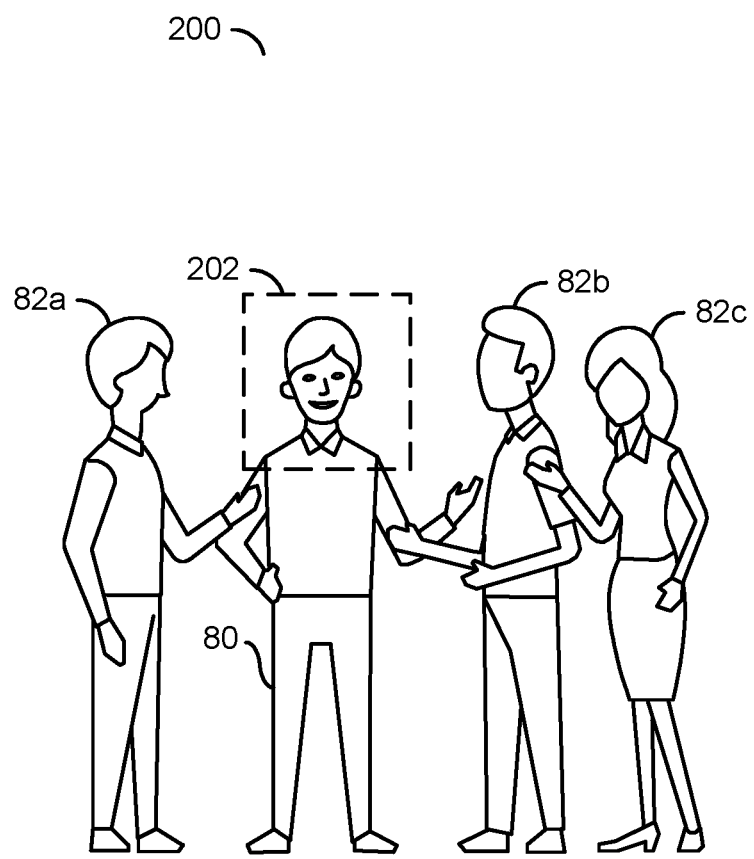
FIG. 4 is a diagram illustrating detecting a speaker in an example video frame.

Referring to FIG. 4, a diagram illustrating detecting a target object 80 in an example video frame is shown. An example video frame 200 is shown. For example, the example video frame 200 may be a representative example of one of the video frames FRAMES_A-FRAMES_N captured by one of the capture devices 152a-152n. The example video frame 200 may capture an area within a field of view captured by the apparatus 100 shown in association with FIG. 1.

The example video frame 200 may comprise objects that may be detected by the apparatus 100 (e.g., a person 80 and people 82a-82c). The example video frame 200 may comprise a target person 80 (e.g., a target object). In one example, the target object 80 may be an audio source. In another example, the target object 80 may be determined based on a location determined in response to a detection by a proximity sensor. An area of interest (e.g., region of interest (ROI)) 202 is shown. The area of interest 202 may be located around a face of the target person 80.

Using the information from the directional microphones 106a-106n (e.g., the signal DIR_AUD) and/or location information from a proximity sensor, the processor 150 may determine the direction of the target person 80. The processor 150 may translate the directional information from the directional microphones 106a-106n to a corresponding location in the video frames FRAMES_A-FRAMES_N. In one example, the area of interest 202 may be the location of the audio source translated to the video frame 200.

Once the direction of the target person 80 has been identified, the processor 150 may perform the video operations on the area of interest 202. In one example, the processor 150 may be configured to crop out the area 202 of the video image capturing the face of the target person 80. The processor 150 may then perform video operations to increase resolution and zoom in on the area of interest 202. The video operations may improve the results of facial recognition.

In some embodiments, the video frame 200 may be a 360-degree video frame (e.g., the camera system 100 may capture a 360-degree field of view). In a 360-degree field of view video frame, all the people 82a-82c and other people (e.g., located behind the apparatus 100) would be in the captured video frame 200. Similarly, the directional audio DIR_AUD may be analyzed by the processor 150 to determine the corresponding location of the audio source 80 in the video frame 200.

In the example video frame 200, multiple faces may be captured. In the example shown, the faces of the people 82a-82c may be captured along with the face of the target person 80. In the case where multiple faces are captured, the face recognition implemented by the processor 150 may be further extended to identify which person is the audio source (e.g., speaking, caused a sound such as broken glass, etc.). The processor 150 may determine that the target person 80 is speaking and the people 82a-82c are not speaking. In one example, the processor 150 may be configured to monitor mouth movements in the captured video frames. The mouth movements may be determined using the computer vision. In some embodiments, the mouth movements may be combined (e.g., compared) with voice data being received. The processor 150 may decide which of the people 82a-82c and the target person 80 is speaking. For example, the processor 150 may determine which mouth movements align to the detected speech in the audio signal DIR_AUD.

The processor 150 may be configured to analyze the directional audio signal DIR_AUD to determine the location of the audio source 80. In some embodiments, the location determined from the directional audio signal DIR_AUD may comprise a direction (e.g., a measurement in degrees from a center of the lens 110, a coordinate in a horizontal direction, etc.). In some embodiments, the location determined from the directional audio signal DIR_AUD may comprise multiple coordinates. For example, the location determined by the processor 150 may comprise a horizontal coordinate and a vertical coordinate from a center of the lens 110. In another example, the location determined by the processor 150 may comprise a measurement of degrees (or radians) of a polar angle and an azimuth angle. In yet another example, the location determined from the directional audio signal DIR_AUD may further comprise a depth coordinate. In the example shown, the location of the area of interest 202 may comprise at least a horizontal and vertical coordinate (e.g., the area of interest 202 is shown at face-level).

Figure 5:
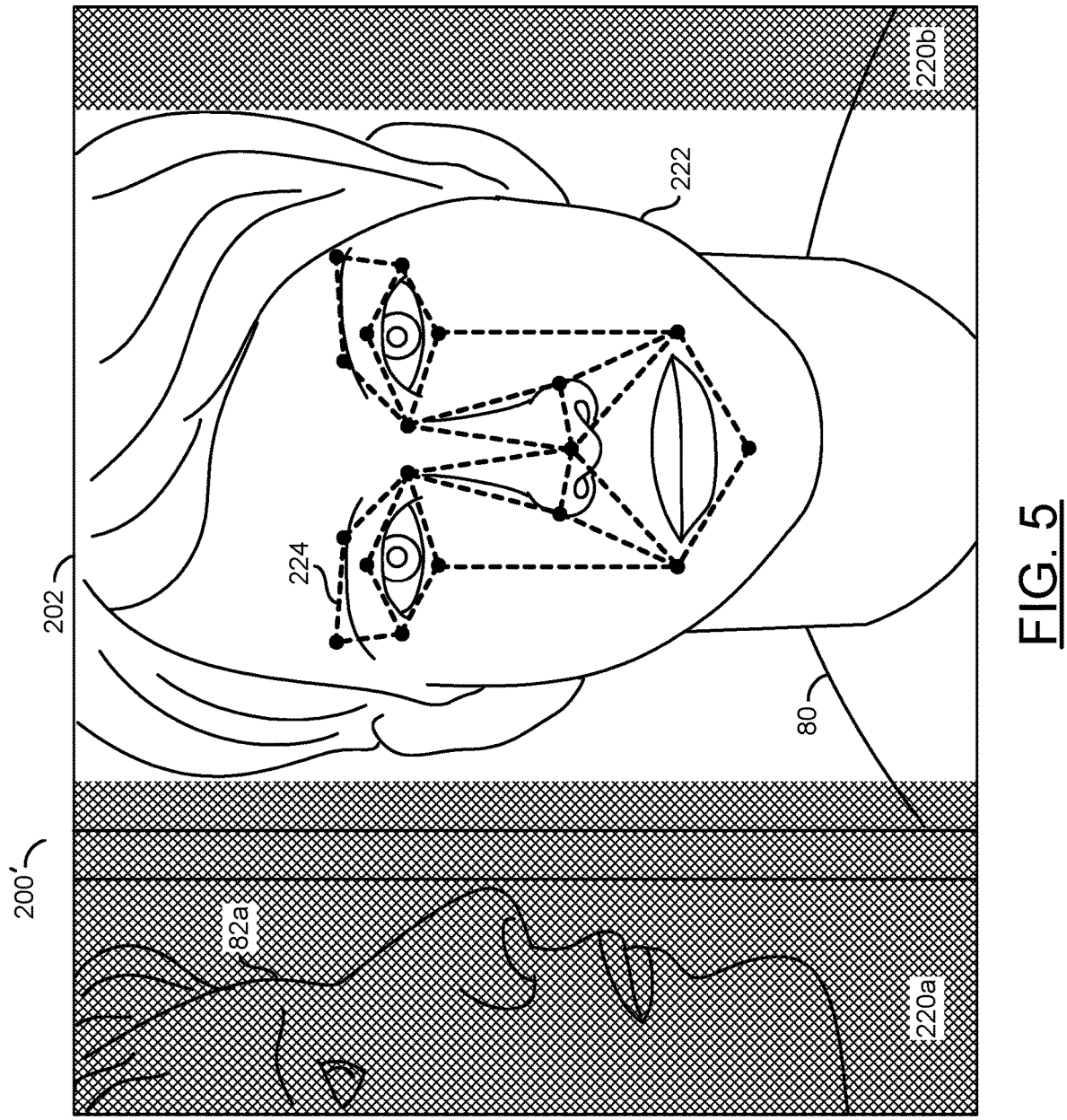
FIG. 5 is a diagram illustrating performing video operations on an example video frame.

Referring to FIG. 5, a diagram illustrating performing video operations on the example video frame 200' is shown. The processor 150 may be configured to perform video operations on the video frame 200' and/or the area of interest 202. In the example shown, the example video frame 200' may comprise the area of interest 202 and two areas 220a-220b adjacent to the area of interest 202. Similarly, there may be areas above and below the area of interest 202.

One of the video operations performed by the processor 150 may be a cropping operation. The cropping operation of the processor 150 may remove (e.g., delete, trim, etc.) one or more portions of the video frame 200. For example, the cropping operation may remove all portions of the video frame 200 except for the area of interest 202. In the example shown, the areas 220a-220b may be the cropped portions of the video frame 200 (e.g., shown for illustrative purposes). In the example shown, the person 82a may be in the cropped area 220a. The cropping operation may remove the person 82a.

The face 222 of the target person 80 is shown within the area of interest 202. The sensors 170a-170n may implement a high-resolution sensor. Using the high resolution sensors 170a-170n, the processor 150 may combine over-sampling of the image sensors 170a-170n with digital zooming within the cropped area 202. The over-sampling and digital zooming may each be one of the video operations performed by the processor 150. The over-sampling and digital zooming may be implemented to deliver higher resolution images within the total size constraints of the cropped area 202.

In some embodiments, one or more of the lenses 110a-110n may implement a fisheye lens. One of the video operations implemented by the processor 150 may be a dewarping operation. The processor 150 may be configured to dewarp the window of interest 202. The dewarping may be configured to reduce and/or remove acute distortion caused by the fisheye lens and/or other lens characteristics. For example, the dewarping may reduce and/or eliminate a bulging effect to provide a rectilinear image.

A higher resolution image of the window of interest 202 may be generated in response to the video operations performed by the processor 150. The higher resolution image may enable the facial recognition computer vision to work with greater precision. The processor 150 may be configured to implement the facial recognition computer vision. The facial recognition computer vision may be one of the video operations performed by the processor 150.

Facial recognition operations 224 are shown on the face 222 of the target person 80 in the area of interest 202. The facial recognition operations 224 may be an illustrative example of various measurements and/or relationships between portions of the face 222 calculated by the processor 150. The facial recognition operations 224 may be used to identify the target person 80 as a specific (e.g., unique) individual and/or basic descriptive characteristics (e.g., tattoos, hair color, eye color, piercings, face shape, skin color, etc.). The facial recognition operations 224 may provide an output of the various measurements and/or relationships between the portions of the face 222. In some embodiments, the output of the facial recognition operations 224 may be used to compare against a database of known faces. The known faces may comprise various measurements and/or relationships between the portions of faces in a format compatible with the output of the facial recognition operations 224. In some embodiments, the output of the facial recognition operations 224 may be configured to provide descriptions of an intruder (e.g., for law enforcement).

Figure 6:
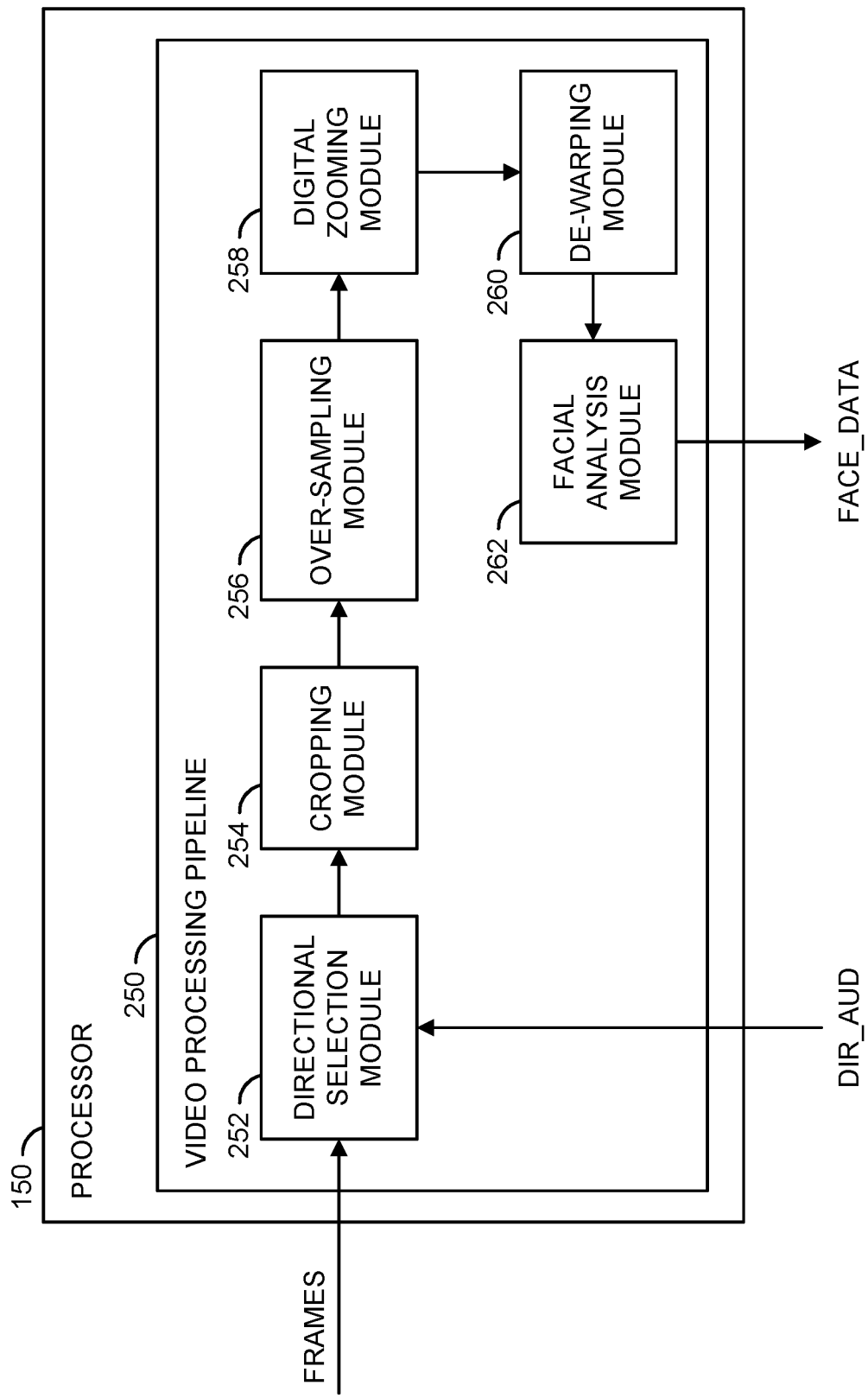
FIG. 6 is a block diagram illustrating an example video pipeline configured to perform video operations.

Referring to FIG. 6, a block diagram illustrating an example video pipeline configured to perform video operations is shown. The processor 150 may comprise a block (or circuit) 250. The circuit 250 may implement a video processing pipeline. The video processing pipeline may be configured to perform the various video operations implemented by the processor 150. The processor 150 may comprise other components (not shown). The number, type and/or arrangement of the components of the processor 150 may be varied according to the design criteria of a particular implementation.

The video processing pipeline 250 may be configured to receive an input signal (e.g., FRAMES) and/or an input signal (e.g., the signal DIR_AUD). The video processing pipeline may be configured to present an output signal (e.g., FACE_DATA). The video processing pipeline 250 may be configured to receive and/or generate other additional signals (not shown). The number, type and/or function of the signals received and/or generated by the video processing pipeline may be varied according to the design criteria of a particular implementation.

The video pipeline 250 may be configured to encode video frames captured by each of the capture devices 152a-152n. In some embodiments, the video pipeline 250 may be configured to perform video stitching operations to stitch video frames captured by each of the lenses 110a-110n to generate a panoramic field of view (e.g., panoramic video frames). The video pipeline 250 may be configured to perform de-warping, cropping, enhancements, rolling shutter corrections, stabilizing, downscaling, packetizing, compression, conversion, blending, synchronizing and/or other video operations. The architecture of the video pipeline 250 may enable the video operations to be performed on high resolution video and/or high bitrate video data in real-time and/or near real-time. The video pipeline module 250 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 250 may enable 4K ultra high resolution with H. 264 encoding at double real time speed (e.g., 60 fps), 4K ultra high resolution with H. 265/HEVC at 30 fps and/or 4K AVC encoding. The type of video operations and/or the type of video data operated on by the video pipeline 250 may be varied according to the design criteria of a particular implementation.

The video processing pipeline 250 may comprise a block (or circuit) 252, a block (or circuit) 254, a block (or circuit) 256, a block (or circuit) 258, a block (or circuit) 260 and/or a block (or circuit) 262. The circuit 252 may implement a directional selection module. The circuit 254 may implement a cropping module. The circuit 256 may implement an over-sampling module. The circuit 258 may implement a digital zooming module. The circuit 260 may implement a dewarping module. The circuit 262 may implement a facial analysis module. The video processing pipeline 250 may comprise other components (not shown). The number, type, function and/or arrangement of the components of the video processing pipeline 250 may be varied according to the design criteria of a particular implementation.

The circuits 252-262 may be conceptual blocks representing the video operations performed by the processor 150. In an example, the circuits 252-262 may share various resources and/or components. The order of the circuits 252-262 may be varied and/or may be changed in real-time (e.g., video data being processed through the video processing pipeline may not necessarily move from the circuit 252, to the circuit 254, then to the circuit 256, etc.). In some embodiments, one or more of the circuits 252-262 may operate in parallel.

The directional selection module 252 may be configured to receive the signal FRAMES (e.g., one or more of the signals FRAMES_A-FRAMES_N) from one or more of the capture devices 152a-152n. The directional selection module 252 may be configured to receive signal DIR_AUD from the directional microphones 106a-106n. The directional selection module 252 may be configured to extract the location of the audio source 80 based on the directional audio signal DIR_AUD. The directional selection module 252 may be configured to translate the information in the directional audio signal DIR_AUD to a location (e.g., coordinates) of the input video frames (e.g., the signal FRAMES). Based on the location, the directional selection module 252 may select the area of interest 202. In one example, the area of interest 202 may comprise Cartesian coordinates (e.g., an X, Y, and Z coordinate) and/or spherical polar coordinates (e.g., a radial distance, a polar angle and an azimuth angle). The format of the selected area of interest 202 generated by the direction selection module 252 may be varied according to the design criteria of a particular implementation.

The cropping module 254 may be configured to crop (e.g., trim to) the region of interest 202 from the full video frame 200 (e.g., generate the region of interest video frame). The cropping module 254 may receive the signal FRAMES and the selected area of interest information from the directional selection module 254. The cropping module 254 may use the coordinates of the area of interest to determine the portion of the video frame to crop. The cropped region may be the area of interest 202.

In an example, cropping the region of interest 202 selected may generate a second image. The cropped image (e.g., the region of interest video frame 202) may be smaller than the original video frame 200 (e.g., the cropped image may be a portion of the captured video). The area of interest 202 may be dynamically adjusted based on the location of the audio source 80 determined by the directional selection module 252. For example, the detected audio source 80 may be moving, and the location of the detected audio source 80 may move as the video frames are captured. The directional selection module 252 may update the selected region of interest coordinates and the cropping module 254 may dynamically update the cropped section 202 (e.g., the directional microphones 106a-106n may dynamically update the location based on the directional audio captured). The cropped section may correspond to the area of interest selected. As the area of interest changes, the cropped portion 202 may change. For example, the selected coordinates for the area of interest 202 may change from frame to frame, and the cropping module 254 may be configured to crop the selected region 202 in each frame. For each frame captured by the capture devices 152a-152n, the cropping module 254 may be configured to crop different coordinates, based on the location information determined from the signal DIR_AUD.

The over-sampling module 256 may be configured to over-sample the image sensors 170a-170n. The over-sampling of the image sensors 170a-170n may result in a higher resolution image. The higher resolution images generated by the over-sampling module 256 may be within total size constraints of the cropped region.

The digital zooming module 258 may be configured to digitally zoom into an area of a video frame. The digital zooming module 258 may digitally zoom into the cropped area of interest 202. For example, the directional selection module 252 may establish the area of interest 202 based on the directional audio, the cropping module 254 may crop the area of interest 202, and then the digital zooming module 258 may digitally zoom into the cropped region of interest video frame. In some embodiments, the amount of zooming performed by the digital zooming module 258 may be a user selected option.

The dewarping operations performed by the hardware dewarping module 260 may adjust the visual content of the video data. The adjustments performed by the dewarping module 260 may cause the visual content to appear natural (e.g., appear as seen by a person viewing the location corresponding to the field of view of the capture devices 152a-152n). In an example, the dewarping module 260 may alter the video data to generate a rectilinear video frame (e.g., correct artifacts caused by the lens characteristics of the lenses 110a-110n). The dewarping operations performed by the hardware dewarping module 260 may be implemented to correct the distortion caused by the lenses 110a-110n. The adjusted visual content may be presented by the dewarping module 260 to enable more accurate and/or reliable facial detection.

Implementing the dewarping module 260 as a hardware module may increase the video processing speed of the processor 150. The hardware implementation of the dewarping module 260 may dewarp the area of interest 202 faster than a software implementation. The hardware implementation of the dewarping module 260 may enable the video to be processed while reducing an amount of delay. For example, with the hardware implementation, the audio detected may be associated with the location of the audio source 80 in near real-time (e.g., low lag). The hardware implementation of the dewarping module 260 may implement the various calculations used to dewarp the area of interest 202 using hardware components. The hardware components used may be varied according to the design criteria of a particular implementation.

The facial analysis module 262 may be configured to perform the facial analysis operations 224. For example, the facial analysis module 262 may be configured to perform the measurements and/or comparisons of the facial features of the face 222 of the target person 80 in the selected window of interest 202. Generally, the video operations performed by the circuits 252-260 may be implemented to facilitate an accurate and/or reliable detection of the facial features 224. For example, a high-resolution and dewarped area of interest 202 may reduce potential errors compared to a video frame that has warping present and/or a low resolution video frame. Cropping the input video frames to the area of interest 202 may reduce an amount of time and/or processing to perform the facial detection compared to performing the facial detection operations on a full video frame.

The facial analysis module 262 may be configured to generate the signal FACE_DATA. The signal FACE_DATA may comprise the facial information extracted from the area of interest 202 using the facial analysis operations 224. The data in the extracted information FACE_DATA may be compared against a database of facial information to find a match for the identity of the target person 80. In some embodiments, the facial analysis module 262 may be configured to perform the comparisons of the detected facial information with the stored facial information in the database.

In some embodiments, the components 252-262 of the video processing pipeline 250 may be implemented as discrete hardware modules. In some embodiments, the components 252-262 of the video processing pipeline 250 may be implemented as one or more shared hardware modules. In some embodiments, the components 252-262 of the video processing pipeline 250 may be implemented as software functions performed by the processor 150.

Figure 7:
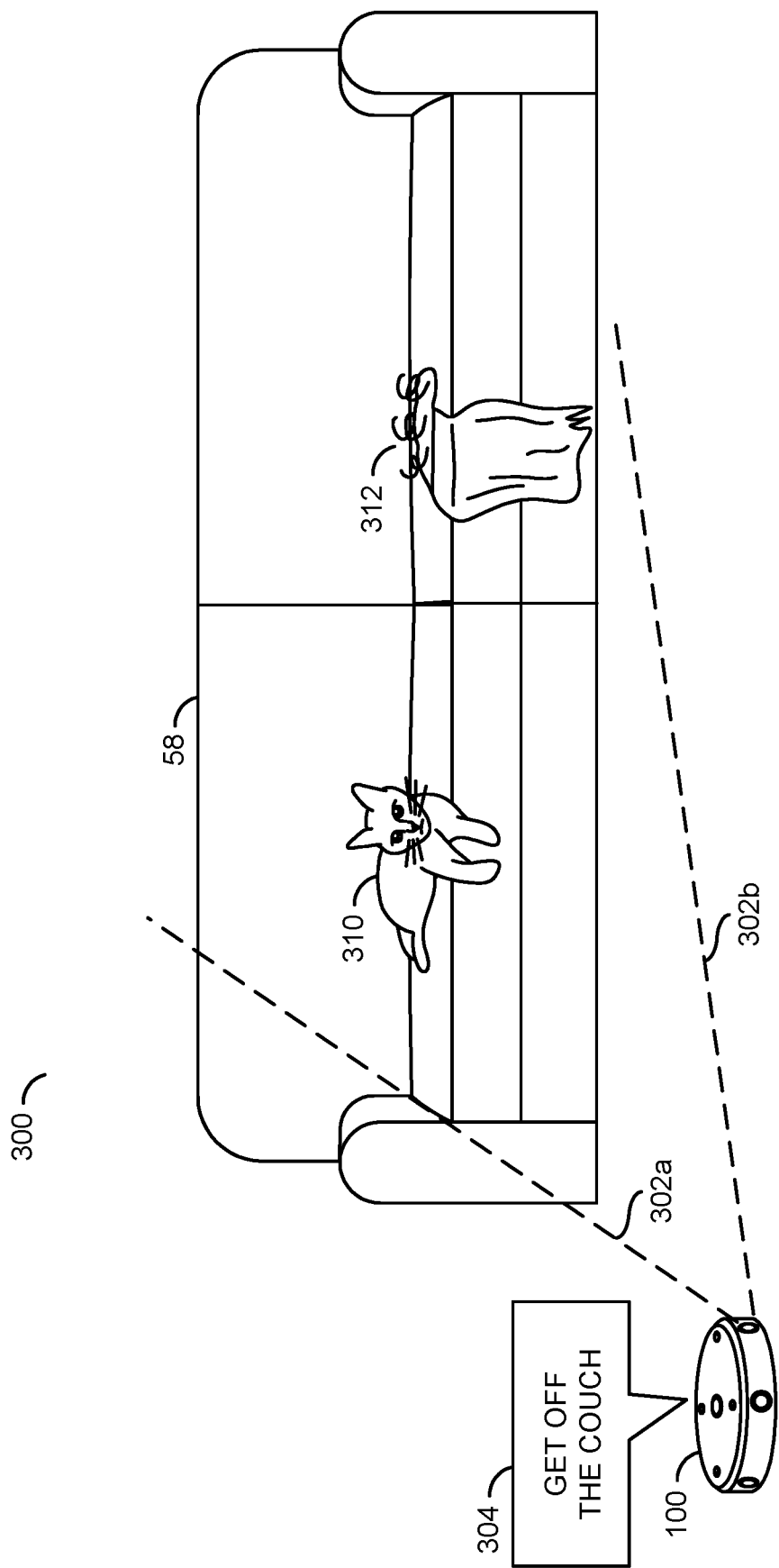
FIG. 7 is a diagram illustrating the apparatus generating an audio message in response to a detected object.

Referring to FIG. 7, a diagram illustrating the apparatus 100 generating an audio message in response to a detected object is shown. An example scenario 300 is shown. In the example scenario 300, the apparatus 100 is shown near the couch 58.

Lines 302a-302b are shown extending from the apparatus 100. The lines 302a-302b may represent a field of view of one or more of the lenses 110a-110n. For example the stereo pair of lenses 120 may capture the field of view 302a-302b in front of the apparatus 100. The video frames captured by the capture devices 152a-152n and communicated to the processor 150 may capture the area within the field of view 302a-302b. The field of view 302a-302n is shown as a representative example. The size, shape and/or range of the field of view 302a-302n may be varied according to the design criteria of a particular implementation.

The field of view 302a-302n may provide a perspective from a low position. The apparatus 100 may move along the floor 52. Since the apparatus 100 is on the floor 52, the field of view 302a-302b may project upwards starting from the low position. In one example, the low position may be approximately 8 cm (e.g., less than 10 cm) from the level of the floor 52. Generally, objects of interest (e.g., people, furniture, valuables, etc.) will be at a level above the low position of the apparatus 100. The capture devices 152a-152n may be configured to capture the field of view 302a-302b that is directed upwards from the low position. For example, the lenses 110a-110n may be configured to capture the floor 52, an area in front of the apparatus 100 and an area above a level of the apparatus 100.

A speech bubble 304 is shown. The apparatus 100 may be a mobile device with security cameras that may be further configured to provide audio warnings to intruders, people and/or pets. The speakers 104a-104n may be configured to emit the audio warnings. The speech bubble 304 may represent the output audio AOUT_A-AOUT_N generated by the speakers 104a-104n in response to the signal DIR_AUD generated by the processor 150.

In the example scenario 300, a pet cat 310 is shown on the couch 58. The cat 310 is shown laying on the couch 58 next to couch damage 312 (e.g., a rip, presumably caused by the cat 310). The speech bubble 304 is shown providing the message, "Get off the couch". For example, the homeowner may not want the cat 310 to be allowed on the couch 58 because the cat 310 may cause harm such as the damage 312. The homeowner may provide instructions (e.g., via the signal INS) to the apparatus 100 that provide rules for detections and responses. In the example shown, the homeowner may provide a rule that if a pet is detected on the couch 58 then an audio message may be generated to scare the pet away.

The apparatus 100 may be configured to receive the rules with various levels of granularity. In one example, the homeowner may specify a rule to detect a pet on the furniture and playback an initial message (e.g., a gentle warning). A second rule may be applied if the pet does not get off the furniture (e.g., a loud beep that would be more likely to startle the pet). In some embodiments, the homeowner may program different audio messages 304 (e.g., a recorded voice, an alarm sound, the sound of thunder, the sound of fireworks, etc.). In some embodiments, the homeowner may provide more specific rules. For example, the cat 310 may not be allowed on the couch 58, but another pet may be allowed on the couch 58. In another example, the cat 310 may not be allowed on the couch 58 but may be allowed on other furniture. The types of rules available for detection, relationships between objects (e.g., object A is not allowed on object B) and/or audio messages available may be varied according to the design criteria of a particular implementation.

In the example scenario 300, the pet cat 310 is shown as the object that is not allowed on the other object 58. In another example, the apparatus 100 may detect people and/or intruders. For example, the apparatus 100 may be configured to detect whether a young child is in a particular room (e.g., the young child may not be allowed to enter a room with fragile collectibles). The facial recognition operations performed by the video processing pipeline 250 may be configured to distinguish between different members of the household (e.g., the adults that may be allowed everywhere, an older child that may be allowed everywhere and the young child that is not allowed in a particular room). In another example, the apparatus 100 may detect intruders. For example, if the facial recognition operations do not detect a match with stored faces of the household members and friends, then the apparatus 100 may play the audio message 304 to warn the intruder to leave.

Figure 8:
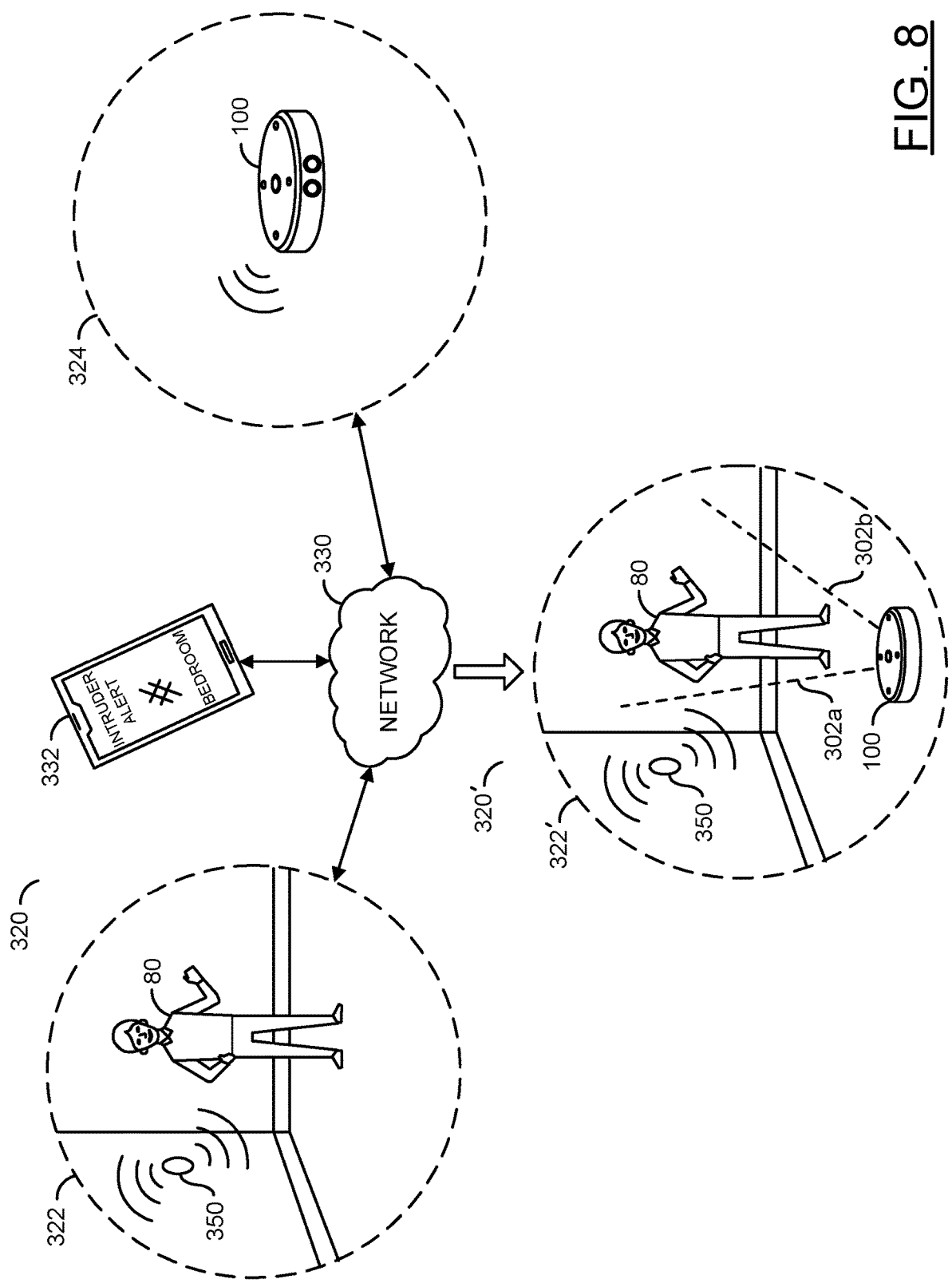
FIG. 8 is a diagram illustrating the apparatus moving to a location of a detected event.

Referring to FIG. 8, a diagram illustrating the apparatus 100 moving to a location of a detected event is shown. A first scenario 320 and a second scenario 320' are shown. The first scenario 320 may occur earlier than the second scenario 320'.

In the first scenario 320, a location 322 and a location 324 are shown. In an example, the location 322 and the location 324 may be separate rooms in a home. The person 80 is shown in the location 322. The apparatus 100 is shown in the location 324. For example, because the apparatus 100 is in the location 324, the apparatus 100 may not be capable of recording video of the person 80 in the location 322 (e.g., no line of sight). For example, the apparatus 100 may be unaware of the presence of the person 80 in the home.

A network 330 is shown. In one example, the network 330 may be a local area network (LAN) of a home. In another example, the network 330 may be the internet. The apparatus 100 is shown communicating wirelessly (e.g., via the communication device 154). The apparatus 100 may be configured to connect to the network 330 to communicate with other device.

A user device 332 is shown. The user device 332 may be a device capable of outputting a display, receiving input and communicating with other devices (e.g., wired or wireless). In the example shown, the user device 332 may be a smartphone. In another example, the user device 332 may be a security terminal (e.g., a desktop computer connected to a monitor). The type of user device 332 implemented may be varied according to the design criteria of a particular implementation.

The apparatus 100 may be configured to stream video data and/or data to the user device 332. In one example, the apparatus 100 may capture and/or encode the video frames and communicate the signal VID to the user device 332. In another example, the apparatus 100 may perform the computer vision operations to detect objects and/or determine what is happening in a video frame. The apparatus 100 may communicate the signal META to the user device 332 to provide information about what has been detected. In the example shown, the smartphone 332 is displaying a message that an intruder has been detected. For example, the signal META may provide data that an intruder has been detected to the smartphone 332 in order to generate a human readable message. The user device 332 may provide the signal INS to the apparatus 100. For example a user may remotely control the movement of the apparatus 100 using the smartphone 332.

In some embodiments, the apparatus 100 may be adapted to work with a companion application that is executable on the smartphone 332. In an example, the apparatus 100 may stream the video via WiFi for remote monitoring on the smartphone 332 using the companion application. The companion application may be configured to select a view that is determined to be appropriate (e.g., a best view) based on the dewarped 360 degree field of view captured by the capture devices 152a-152n. In some embodiments, the processor 150 may determine the appropriate view and the signal META may be communicated to the smartphone 332 with information about which view is the best view based on the objects detected by the processor 150.

An external sensor 350 is shown in the location 322. In an example, the external sensor 350 may be a passive infrared (PIR) sensor. In another example, the external sensor 350 may comprise a microphone. In yet another example, the external sensor 350 may be a stationary security camera. The external sensor 350 may be configured to communicate wirelessly via the network 330. In the example shown, the external sensor 350 may detect the presence of the person 80 at the location 322 and communicate the signal INS via the network 330 to the apparatus 100 in the location 324. The signal INS may provide the information to the apparatus 100 that a detection has been made and the location of the detection. In some embodiments, the signal INS may comprise video data captured by the external sensor that the processor 150 may analyze to determine where to go to provide an alternate viewing angle.

The second scenario 320' may comprise the location 322'. In the second scenario 320' the location 322' may be the same as the location 322 from the first scenario 320 but at a later time. Based on the information provided by the external sensor 350, the apparatus 100 may move from the location 324 to the location 322'. The apparatus 100 is shown in the location 322'. The field of view 302a-302b is shown capturing an upward view from a low position of the person 80. In the example shown, the apparatus 100 is shown in front of the person 80 to capture the field of view 302a-302b. However, in some embodiments, the external sensor 350 may provide information that indicates from which angle the apparatus 100 should view the person 80. Since the apparatus 100 is freely mobile, the apparatus 100 may be able to provide many different views that a stationary surveillance device would not be able to capture. For example, the apparatus 100 may travel behind the person 80 or travel to either side of the person 80 to capture the field of view 302a-302b.

The apparatus 100 may be configured to respond to the information provided by the external sensor 350. The apparatus 100 may move to the location of the external sensor 350. For example, if the external sensor 350 did not make a detection, the apparatus 100 may continue performing the house cleaning functionality at the location 324. The information provided by the external sensor 350 may act as an interrupt for the apparatus 100. The interrupt may cause the apparatus 100 to switch from a house cleaning mode of operation to a security mode of operation.

The location of an intruder or object of interest may be found by a combination of audio cues from the directional microphones 106a-106n and/or visual cues from analyzing video frames captured by the cameras 152a-152n combined with computer vision analytics. In some embodiments, a user may operate the user device 332 to provide manual control of the apparatus 100 from a remote monitor. Once the direction of the intruder 80 has been identified, the processor 150 may be configured to crop out an area of the video image capturing the face 222 of the intruder 80 (e.g., the area of interest 202). Using the high resolution sensor 170, the video processing pipeline 250 may combine oversampling of the image sensor 170 with digital zooming within the cropped area 202 to deliver higher resolution images within the total size constraints of the cropped area 202. The higher resolution image enables the processor 150 to perform the computer vision operations (e.g., the facial recognition) with greater precision.

The apparatus 100 may be configured to move to a location in response to detected audio. For example, the detected audio may act as an interrupt to change the mode of operation for the apparatus 100 from the housekeeping mode of operation to the surveillance mode of operation. The directional microphones 106a-106n may generate the signal DIR_AUD in response to detecting the audio AIN_A-AIN_N. The processor 150 may analyze the directional audio signal DIR_AUD to determine whether the audio corresponds to an expected sound (e.g., people talking, a dog barking, the TV, etc.) or an unexpected sound (e.g., glass breaking, a person talking outside of business hours, an object falling, etc.). If the sound is unexpected, the processor 150 may determine a direction and/or a distance of the source of the unexpected audio from the signal DIR_AUD. The apparatus 100 may be configured to move to a new location that corresponds to the direction and/or location of the unexpected sound in order to provide video data of the audio source (e.g., provide surveillance).

Figure 9:
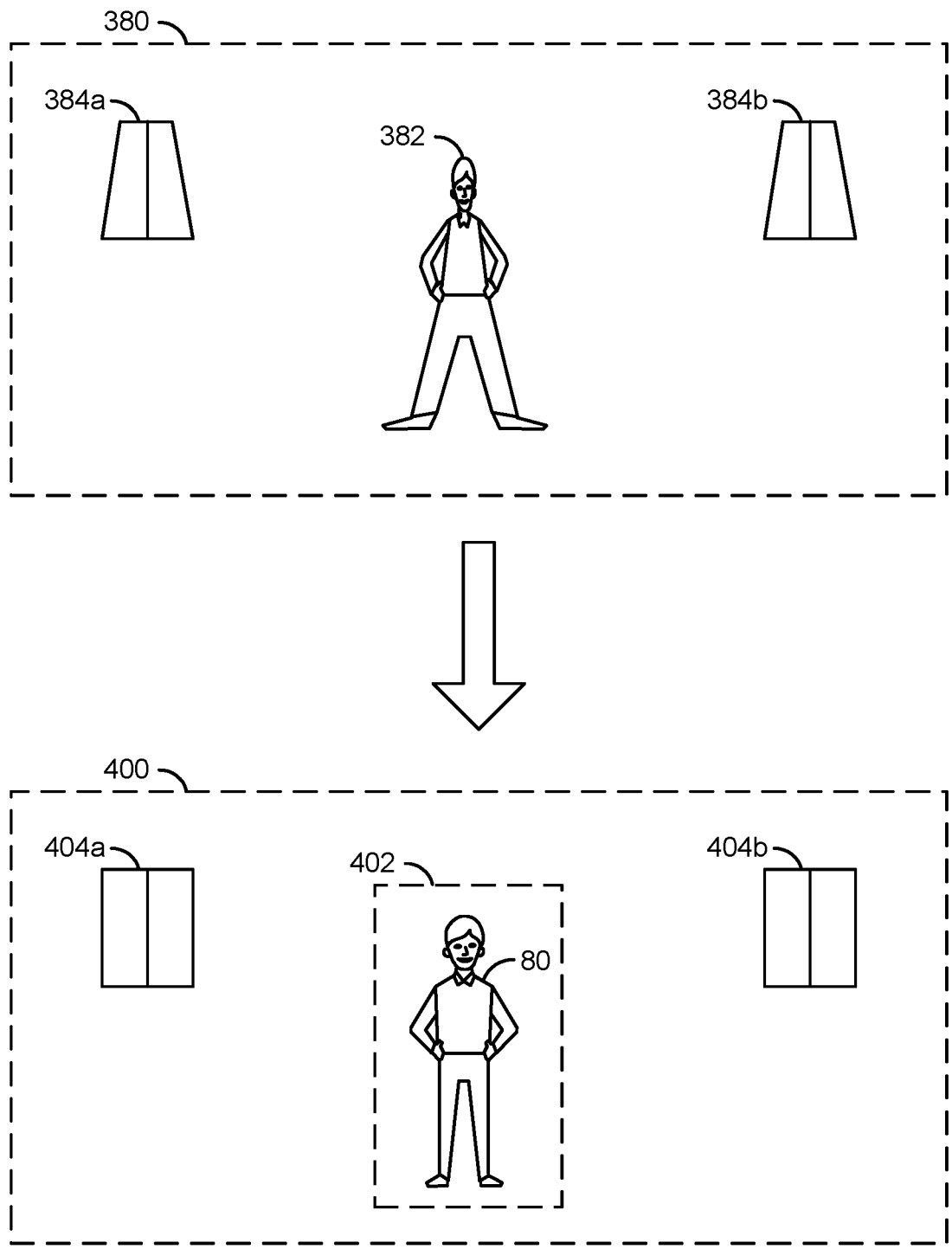
FIG. 9 is a diagram illustrating an example captured video frame and an example dewarped frame.

Referring to FIG. 9, a diagram illustrating an example captured video frame and an example dewarped frame is shown. A captured video frame 380 is shown. The captured video frame 380 may be one of the video frames captured by the capture devices 152a-152n. In an example, the captured video frame 380 may be one of the video frames FRAMES_A-FRAMES_N. The captured video frame 380 may be a representative example. The content, size, shape, aspect ratio and/or warping present in the captured video frame 380 may be varied according to the design criteria of a particular implementation.

The example captured video frame 380 may comprise an object 382 and objects 384a-384b. The object 382 and the objects 384a-384b may appear warped in the captured video frame 380. In one example, the warping may be caused by a combination of the shape of the lenses 110a-110n and the field of view 302a-302b. In the example shown, the object 382 may be a distorted person, and the objects 384a-384b may be distorted windows.

Some of the warping present in the captured video frame 380 may be caused by the low position/angle of the capture devices 152a-152n of the apparatus 100. Since the apparatus 100 operates low to the ground, the field of view 302a-302b may be directed upwards from the low position. Capturing the captured video frame 380 upwards from the low angle may result in a key-stoning effect. The key-stoning effect may result in the object 382 and/or the objects 384a-384b appearing wider at the bottom of the captured video frame 380 and narrower at the top of the captured video frame 380.

The processor 150 may be configured to correct the key-stoning distortion and/or other distortion (or warping) in the captured video frame 380. For example, the captured video frame 380 (e.g., one of the signals FRAMES_A-FRAMES_N) may be processed through the video processing pipeline 250. The dewarping module 260 in the video processing pipeline 250 may be configured to correct the warping and/or distortion in the captured video frame 380.

A dewarped video frame 400 is shown. The dewarped video frame 400 may be a version of the captured video frame 380 that has been dewarped by the dewarping module 260. In an example, the dewarped video frame 400 may be one of the video frames transmitted as the signal VID. For example, the capture devices 152a-152n may generate the signals FRAMES_A-FRAMES_N, the processor 150 may perform the dewarping (and other video processing operations) and output dewarped video frames similar to the dewarped video frame 400 in the example shown. The dewarped video frame 400 may be a representative example. The content, size, shape, aspect ratio of the dewarped video frame 400 may be varied according to the design criteria of a particular implementation.

The example dewarped video frame 400 may comprise the person 80, a dotted box 402 and objects 404a-404b. An appearance of the person 80 may be the result of dewarping the object 382 in the captured video frame 380. The objects 404a-404b may be windows that are dewarped versions of the warped objects 384a-384b in the captured video frame 380. The dotted box 402 may represent object detection performed by the processor 150.

The dewarping performed by the dewarping module 260 may be configured to correct the warping present in the captured video frame 380. The corrections performed by the dewarping module 260 may be configured to counteract the effects caused by the low position/angle of the capture devices 152a-152n of the apparatus 100. For example, the dewarping module 260 may correct the key-stoning effect. The dewarping module 260 may be configured to straighten the image in the captured video frame 380 to generate the dewarped video frame 400 that appears similar to what a human would see if the human was looking at the same location that the apparatus 100 was capturing when the captured video frame 380 was acquired. For example, the dewarping module 260 may narrow the wider distortion at the bottom of the captured video frame 380 and widen the narrower distortion at the top of the captured video frame 380 to normalize the various shapes.

The dewarped video frame 400 may enable and/or improve (e.g., compared to using a warped video frame) an accuracy of object detection. In the example video processing pipeline 250 shown in association with FIG. 6, the facial analysis module 262 may be operational after the dewarping module 260 (e.g., to operate on the dewarped video frames). The video processing pipeline 250 may comprise other modules for general object detection (e.g., to recognize characteristics and/or features other than faces such as pets, people, bodies, furniture, household items and decorations, etc.). In the example shown, the bounding box 402 around the whole body of the person 80 may represent the detection of the person 80 by the processor 150. The detection of the object may be performed on the dewarped video frame 400.

The processor 150 may be configured to detect objects (e.g., the bounding box 402 may represent the detection of the person 80) in the dewarped video frames. The processor 150 may be configured to extract data about the detected objects from the dewarped video frames. The extracted data may be based on the characteristics of the detected objects. For example, the processor 150 may perform the video operations to detect characteristics about the objects in the detected objects. The characteristics of the detected objects may comprise visible features and/or inferences made about the visible features. For example, the characteristics color, shape, orientation and/or a size of an objects and/or components of an object (e.g., the leg may be a component of the person 80). The processor 150 may extract the data to store and/or analyze a symbolic representation of the visual data that may be readable by a computer.

Figure 10:
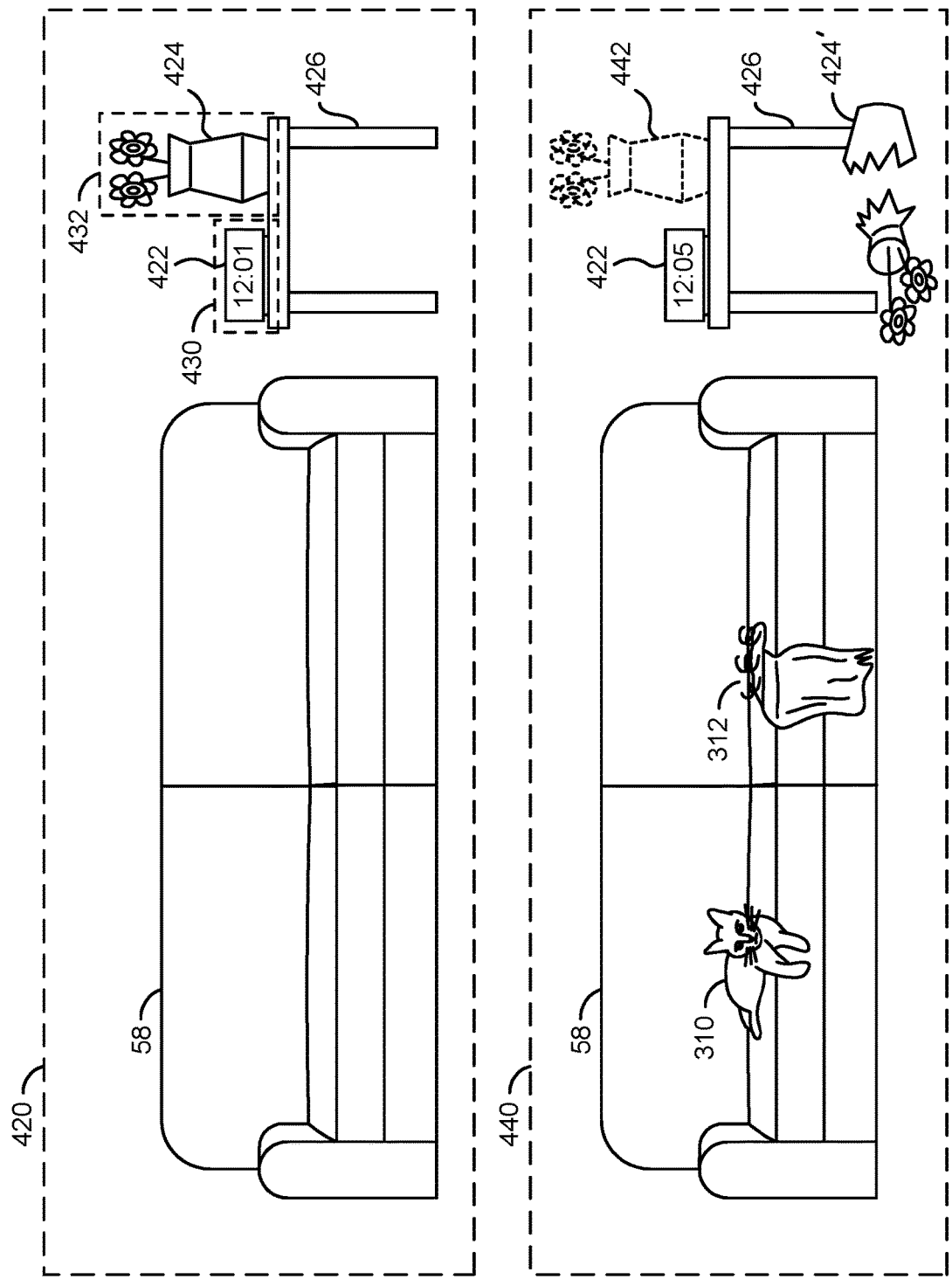
FIG. 10 is a diagram illustrating an example of mapped object locations and detecting an out of place object.

Referring to FIG. 10, a diagram illustrating an example of mapped object locations and detecting an out of place object is shown. A video frame 420 is shown. The video frame 420 may be an example video frame captured by the apparatus 100. In the example video frame 420, the dewarping may have already been performed by the processor 150.

The example video frame 420 may comprise the couch 58, an object 422, an object 424 and/or an object 426. The object 422 may be a digital clock displaying a time of 12:01. The object 424 may be a vase with flowers. The object 426 may be a table.

The apparatus 100 may be configured to capture the video data and perform the object detection while performing the housecleaning operations. Since the apparatus 100 may travel throughout an area (e.g., a household, offices in a business, aisles in a store, etc.) while performing the housecleaning operations, the apparatus 100 may capture video data comprising an entire layout of a building and/or area. The apparatus 100 may be configured to generate a map and/or layout of the area. The mapping performed by the apparatus 100 may be used to determine the path planning. The mapping performed by the apparatus 100 may also be used to determine the locations of objects. For example, many objects in a home are placed in one location and not moved often (e.g., items are placed where they "belong"). Using the information about the locations of objects, the apparatus 100 may be configured to detect items that are out of place.

A dotted box 430 is shown around the clock 422. A dotted box 432 is shown around the vase 424. The dotted box 430 may represent the object detection of the clock 422 performed by the processor 150. The dotted box 430 may further represent an expected location of the clock 422. For example, based on detecting the clock 422 on the table 426, the apparatus 100 may determine that the clock 422 belongs on the table 426. The dotted box 432 may represent the object detection of the vase 424 performed by the processor 150. The dotted box 432 may further represent an expected location of the vase 424. For example, based on detecting the vase 424 on the table 426, the apparatus 100 may determine that the vase 424 belongs on the table 426.

In some embodiments, the apparatus 100 may determine where an object belongs based on detecting the object with respect to a location in the area and/or other nearby objects. In some embodiments, the apparatus 100 may determine where an object belongs based on repeated detections of a particular object in a particular location (e.g., if the apparatus 100 travels the entire household once per day, the apparatus 100 may detect the same object in the same location 7 times in a week to determine that the object belongs at the particular location). Relying on multiple detections may prevent false positives for temporarily placed objects (e.g., a homeowner may leave a grocery bag near the front door when returning from shopping but the grocery bag may not belong near the front door). The apparatus 100 may also allow for some variation in the location of the object to prevent false positives. For example, the clock 422 may belong on the table 426, but the apparatus 100 may allow for variations in location of the clock 422 on the table 426 (e.g., the clock 422 is shown to the left of the vase 424, but the apparatus 100 may consider the clock 422 to also belong on the table 426 on the right side of the vase 424).

In some embodiments, the user device 332 may be used to assist the mapping performed by the apparatus 100. In an example, the apparatus 100 may upload the signal VID and the companion application on the smartphone 332 may be used to view the dewarped video. The smartphone 332 may provide a touchscreen interface. The signal META may provide information about the objects detected in the captured video data for the companion application. Based on the objects detected and the video data, the companion application may enable the user to interact with the video and provide touch input to identify which objects belong in which location. For example, the signal VID may provide the example video frame 420 to the smartphone and the user of the companion application may tap (e.g., touch input) the clock 422 and the vase 424 to identify the clock 422 and the vase 424 as objects to monitor for changes in location.

A video frame 440 is shown. The video frame 440 may be an example video frame captured by the apparatus 100. In the example video frame 440, the dewarping may have already been performed by the processor 150. The video frame 440 may be a video frame captured of the same area as shown in the video frame 420, but at a later time. For example, in the video frame 440, the clock 422 is showing a time of 12:05, compared to the time 12:01 on the clock 422 in the video frame 420.

The example video frame 440 may comprise the couch 58 and the table 426. The cat 310 and the damage 312 are shown on the couch. The clock 322 is shown on the table 426. The vase 424' is shown as broken on the floor. In the example shown, after the video frame 420 was captured, the vase 424' was knocked over (presumably by the cat 310 that also caused the damage 312). For example, by analyzing the video frames captured in between the time when the video frame 440 was captured and the frame 420 was captured, there may be video evidence of the cat 310 jumping on the table 310, swatting the vase 424 to the ground and ripping the couch 58 to cause the damage 312.

A dotted shape 442 is shown. The dotted shape 442 may correspond with the shape and location of the vase 424 (e.g., from the earlier video frame 420). The dotted shape 442 may represent the expected (or proper) location of the vase 424. In the video frame 440, the vase 424 is not in the expected location 442.

The apparatus 100 may be configured to generate a reaction when an object is not in the expected location. In one example, the reaction may be to send a notification to the user device 332. In another example, the reaction may be to generate audio from the speakers 104a-104n (e.g., an alarm). In yet another example, the reaction may be to explore the area to capture video frames from alternate angles. The type of reaction by the apparatus 100 may be determined by the processor 150 based on audio recorded, the objects detected in the video frames and/or characteristics of the objects detected using the video operations. The type of reaction by the apparatus 100 may be determined in response to the signal INS. The type of reaction may be varied according to the design criteria of a particular implementation.

In the example shown, the vase 424' is not in the expected location 442 (e.g., the vase 424' may be an out-of-place object). The apparatus 100 may generate the reaction when the vase 424' is not in the expected location 442. The apparatus 100 may generate the reaction due to other detections. In one example, the reaction may be generated in response to detecting the cat 310 on the couch 58. In another example, the reaction may be generated in response to detecting the damage 312 to the couch 58. In still another example, the reaction may be generated in response to detecting a new object (e.g., detecting a brick on the floor that has been thrown through a window, detecting feces on the carpet left by a pet, detecting a stain on the carpet that the apparatus 100 may not be capable of cleaning, etc.). In another example, the apparatus 100 may check a status of the detected objects. For example, if the flowers in the vase 424 are dried out, the reaction may be to notify the homeowner that the plants need to be watered. The types of events detected by the apparatus 100 may be varied according to the design criteria of a particular implementation.

Figure 11:
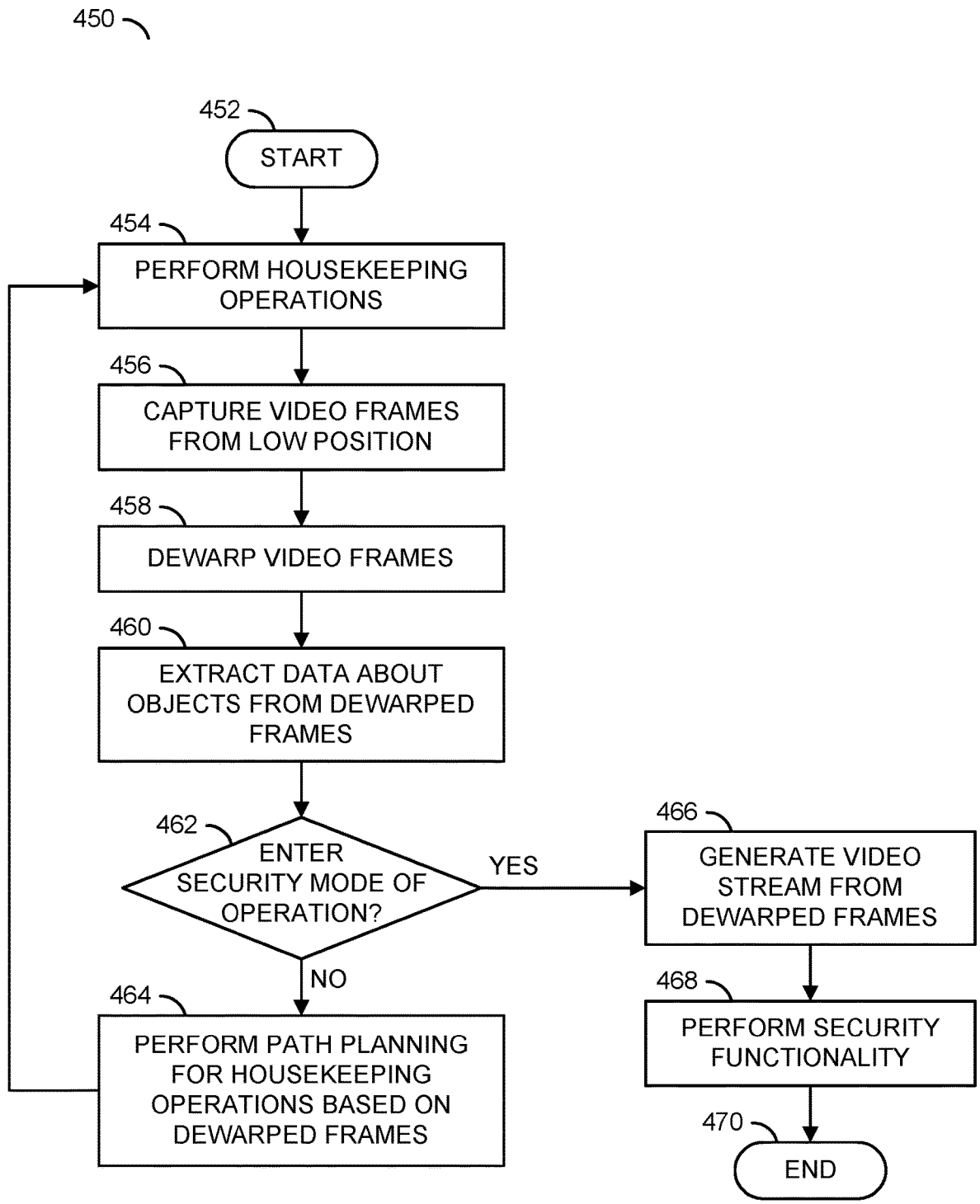
FIG. 11 is a flow diagram illustrating a method for implementing an autonomous robotic vacuum with a mobile security functionality.

Referring to FIG. 11, a method (or process) 450 is shown. The method 450 may implement an autonomous robotic vacuum with a mobile security functionality. The method 450 generally comprises a step (or state) 452, a step (or state) 454, a step (or state) 456, a step (or state) 458, a step (or state) 460, a decision step (or state) 462, a step (or state) 464, a step (or state) 466, a step (or state) 468, and a step (or state) 470.

The step 452 may start the method 450. In the step 454, the apparatus 100 may perform the housekeeping operations. For example, the processor 150 may operate in the housekeeping mode of operation by using the movement control module 158 to navigate through an environment while using the vacuum control module 160 to suck up debris into the container 162. In the step 456, the capture devices 152a-152n may capture the video frames FRAMES_A-FRAMES_N from the low position (e.g., near the floor 52). Next, in the step 458, the processor 150 may receive the video frames FRAMES_A-FRAMES_N process the video frames and the dewarping module 260 may perform video operations to dewarp the video frames (e.g., to correct distortion caused by the lenses 110a-110n and/or the low position from which the video frames were captured). For example, the processor 150 may generate dewarped video frames similar to the example dewarped frame shown 400 shown in association with FIG. 9. In the step 460, the processor 150 may perform computer vision operations to extract data about objects from the dewarped video frames. In one example, the data may comprise facial recognition information, information about the size and shape of objects, colors, etc. Next, the method 450 may move to the decision step 462.

In the decision step 462, the processor 150 may determine whether the apparatus 100 should enter the security mode of operation. In one example, the processor 150 may determine whether to change from the housekeeping mode of operation to the security mode of operation based on the data extracted corresponding to objects detected in the dewarped video frames. In another example, the processor 150 may determine whether to enter the security mode of operation in response analyzing detected audio. In yet another example, the processor 150 may determine whether to enter the security mode of operation in response to external input (e.g., input from a user, input from the network-attached remote sensor 350, etc.). If the processor 150 determines not to enter the security mode of operation, the method 450 may move to the step 464. In the step 464, the processor 150 may perform path planning for the housekeeping operations based on the data extracted from the dewarped video frames (e.g., to avoid obstacles and/or move to new locations). Next, the method 450 may return to the step 454.

In the decision step 462, if the processor 150 determines to enter the security mode of operation, the method 450 may move to the step 466. In the step 466, the processor 150 may generate the video stream (e.g., the signal VID) from the dewarped video frames. For example, the processor 150 may provide the signal VID to the communication device 154 in order to stream the video to a remote device such as the smartphone 332. Next, in the step 468, the processor 468 may perform security functionality (e.g., stream video, determine which perspective to view a detected object, determine responses to detected objects, etc.). Next, the method 450 may move to the step 470. The step 470 may end the method 450.

Figure 12:
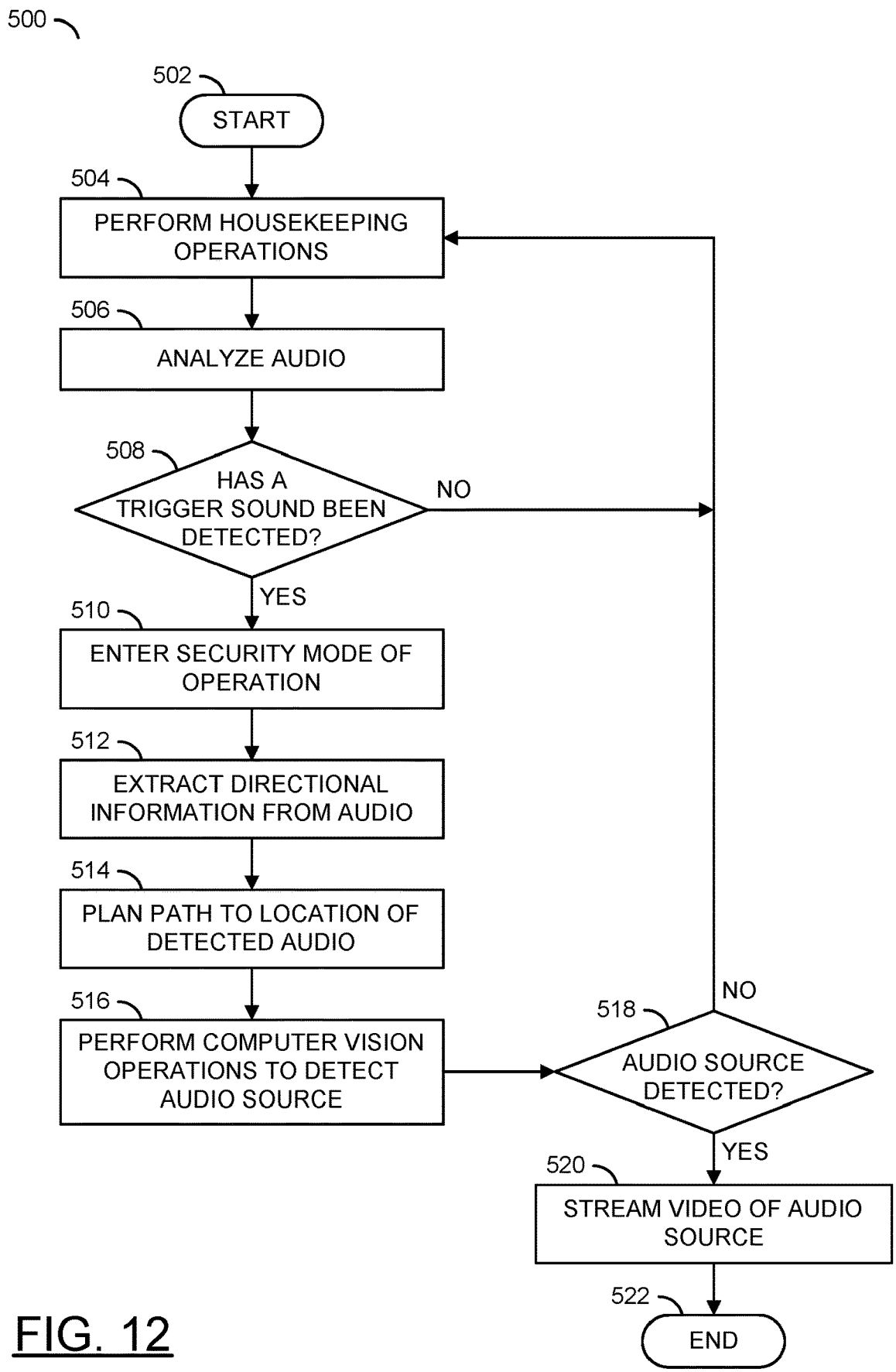
FIG. 12 is a flow diagram illustrating a method for operating in a security mode in response to detecting audio.

Referring to FIG. 12, a method (or process) 500 is shown. The method 500 may operate in a security mode in response to detecting audio. The method 500 generally comprises a step (or state) 502, a step (or state) 504, a step (or state) 506, a decision step (or state) 508, a step (or state) 510, a step (or state) 512, a step (or state) 514, a step (or state) 516, a decision step (or state) 518, a step (or state) 520, and a step (or state) 522.

The step 502 may start the method 500. In the step 504, the apparatus 100 may perform the housekeeping operations (e.g., operate in the housekeeping mode). Next, in the step 506, the processor 150 may analyze the audio input. For example, the directional microphones 106a-106n may capture the audio AIN_A-AIN_N and generate the directional audio information DIR_AUD for the processor 150. Next, the method 500 may move to the decision step 508.

In the decision step 508, the processor 150 may determine whether a trigger sound has been detected. In one example, the trigger sound may be audio that matches pre-defined criteria (e.g., frequency range, volume level, repeating audio, etc.). In another example, the trigger sound may be audio that matches pre-defined sounds (e.g., human voices, breaking glass, footsteps at a time when people in the household are normally asleep, etc.). If the processor 150 determines that the trigger sound has not been detected, the method 500 may return to the step 504. If the processor 150 determines that the trigger sound has been detected, the method 500 may move to the step 510.

In the step 510, the apparatus 100 may enter the security mode of operation. Next, in the step 512, the processor 150 may extract the directional information from the audio DIR_AUD. Using the directional audio, the processor 150 may determine and/or approximate a location of the sound (e.g., based on distance, direction and/or prior knowledge of the layout of the environment). In the step 514, the processor 150 may plan a path to the location of the detected audio. For example, using the computer vision operations (e.g., to avoid obstacles) and/or a mapping of the environment (e.g., stored based on previous computer vision operations of the environment), the processor 150 may determine a path to the location determined based on analyzing the directional audio DIR_AUD. Next, in the step 516, the apparatus 100 may move to the location determined based on the directional audio DIR_AUD and perform the computer vision operations to attempt to detect the audio source. For example, the processor 150 may capture the video frames FRAMES_A-FRAMES_N and perform the computer vision operations to determine if any objects could have generated the detected audio (e.g., a person, broken glass, a pet, a lamp knocked over, etc.). Next, the method 500 may move to the decision step 518.

In the decision step 518, the processor 150 may determine whether the audio source has been detected. If the audio source has not been detected, then the method 500 may return to the step 504. If the audio source has been detected, then the method 500 may move to the step 520. In the step 520, the processor 150 may stream the video signal VID of the audio source via the communication device 154. Next, the method 500 may move to the step 522. The step 522 may end the method 500.

Figure 13:
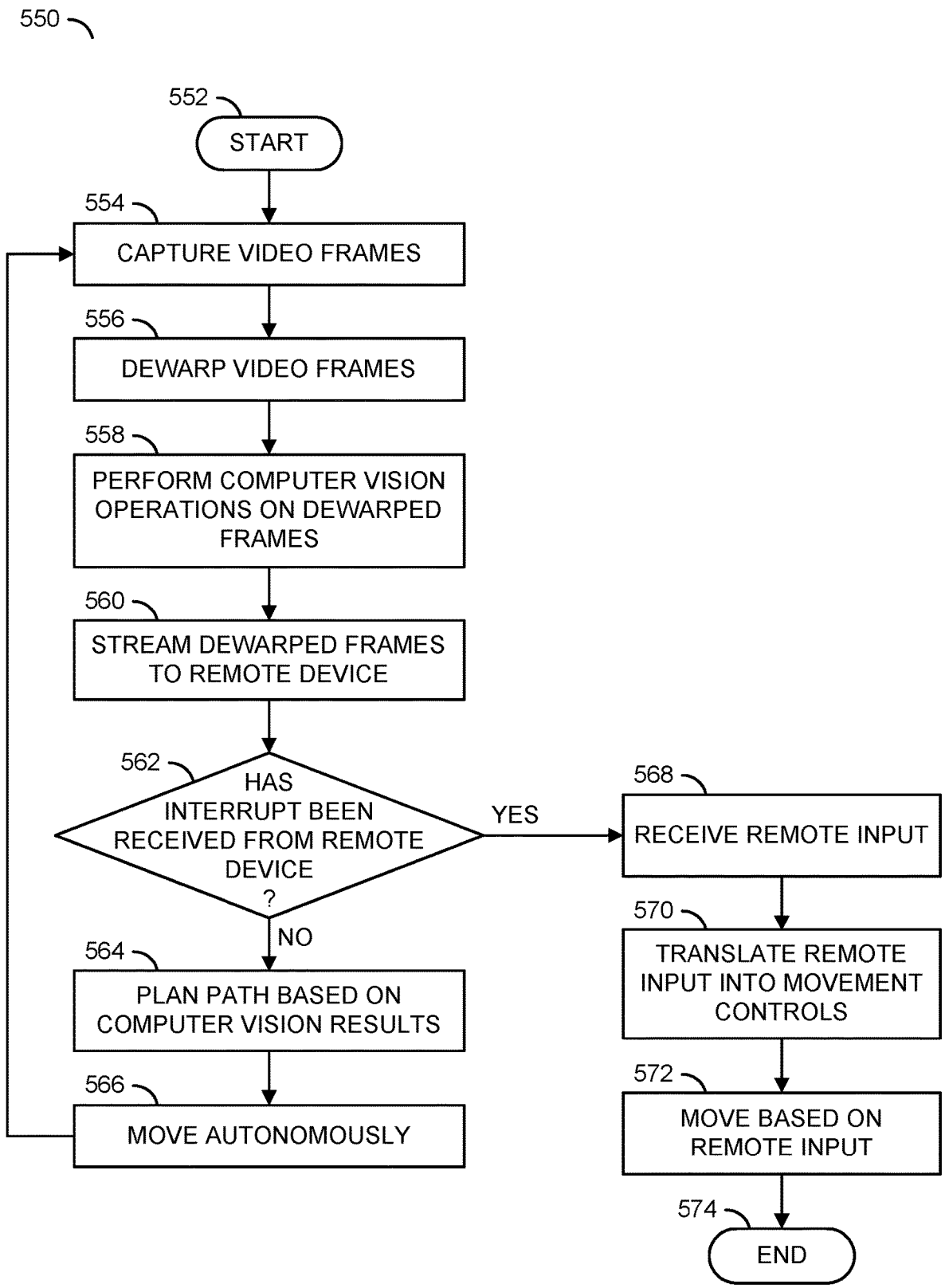
FIG. 13 is a flow diagram illustrating a method for streaming video to and receiving movement instructions from a remote device.

Referring to FIG. 13, a method (or process) 550 is shown. The method 550 may stream video to and receive movement instructions from a remote device. The method 550 generally comprises a step (or state) 552, a step (or state) 554, a step (or state) 556, a step (or state) 558, a step (or state) 560, a decision step (or state) 562, a step (or state) 564, a step (or state) 566, a step (or state) 568, a step (or state) 570, a step (or state) 572, and a step (or state) 574.

The step 552 may start the method 550. In the step 554, the capture devices 152a-152n may capture the video frames and the processor 150 may analyze the video frames FRAMES_A-FRAMES_N. Next, in the step 556, the dewarping module 260 may dewarp the video frames to generate the dewarped video frames. In the step 558, the processor 150 may perform the computer vision operations on the dewarped video frames. Next, in the step 560, the processor 150 may stream the dewarped video frames via the communication device 154 to the remote device 332 (e.g., a remote computer terminal, a smartphone, a tablet computer, etc.). Next, the method 550 may move to the decision step 562.

In the decision step 562, the processor 150 may determine whether an interrupt request has been received from the remote device 332. For example, the interrupt request may be received by the communication device 154 and presented to the processor 150 as the signal INS. If the interrupt has not been received, the method 550 may move to the step 564. In the step 564, the processor 150 may plan a path for movement based on the computer vision results. Next, in the step 566, the apparatus 100 may move autonomously (e.g., the processor 150 may generate the signal MOV to enable the movement control module 158). Next, the method 550 may return to the step 554.

In the decision step 562, if the interrupt request has been received, the method 550 may move to the step 568. In the step 568, the processor 150 may receive the remote input (e.g., the signal INS). For example, the remote input signal INS may comprise movement control instructions (e.g., to enable manual control for a user). Next, in the step 570, the processor 150 may translate the manual controls from the remote input signal INS into the movement controls and generate the signal MOV for the movement control module 158. In the step 572, the movement control module 158 may cause the movement based on the remote input. Next, the method 550 may move to the step 574. The step 574 may end the method 550.

Figure 14:
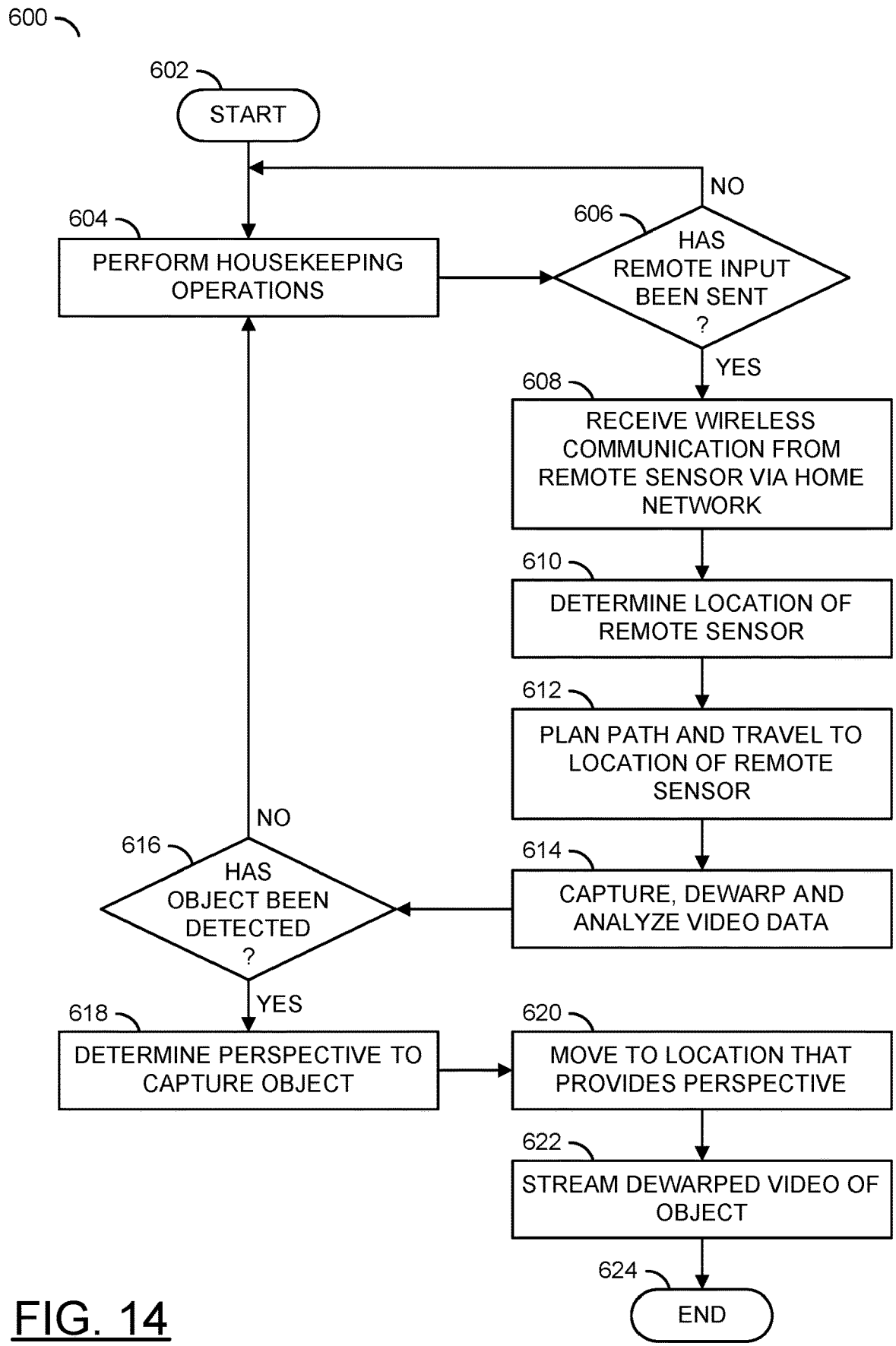
FIG. 14 is a flow diagram illustrating a method for investigating a location in response to input from a remote sensor.

Referring to FIG. 14, a method (or process) 600 is shown. The method 600 may investigate a location in response to input from a remote sensor. The method 600 generally comprises a step (or state) 602, a step (or state) 604, a decision step (or state) 606, a step (or state) 608, a step (or state) 610, a step (or state) 612, a step (or state) 614, a decision step (or state) 616, a step (or state) 618, a step (or state) 620, a step (or state) 622, and a step (or state) 624.

The step 602 may start the method 600. Next, in the step 604, the apparatus 100 may perform the housekeeping operations. Next, the method 600 may move to the decision step 606. In the decision step 606, the apparatus 100 may determine whether remote input has been sent. For example, the remote sensor 350 may communicate with the apparatus 100. If no remote input has been sent, the method 600 may return to the step 604. If the remote input has been sent, the method 600 may move to the step 608.

In the step 608, the communication device 154 may receive the wireless communication from the remote sensor 350 via the network 330. The communication device 154 may generate the signal INS in response to the communication received from the remote sensor 350. Next, in the step 610, the processor 150 may read the signal INS to determine the location of the remote sensor 350. In an example, the remote sensor 350 may communicate a location. In another example, the remote sensor 350 may communicate a device ID and the memory 156 may store a location associated with the device ID. In the step 612, the processor 150 may plan a path and then travel to the location of the remote sensor 350. Next, in the step 614 the capture devices 152a-152n may capture video frames and then the processor 150 may dewarp the video frames and analyze the dewarped frames. Next, the method 600 may move to the decision step 616.

In the decision step 616, the processor 150 may determine whether an object has been detected. For example, the processor 150 may perform the computer vision operations to detect objects in the dewarped video frames. If an object has not been detected, the method 600 may return to the step 604. If an object has been detected, the method 600 may move to the step 618. In the step 618 the processor 150 may determine a perspective for capturing the object. For example, the processor 150 may analyze the location (e.g., the room) to determine viewpoints for capturing the object.

To select a desirable perspective, the processor 150 may take into account obstacles such as furniture that may block the field of view of the capture devices 152a-152n. The processor 150 may also take into account perspectives captured by other surveillance devices (e.g., to avoid capturing a similar perspective as a stationary video camera). In some embodiments, the processor 150 may take into account the type of object. For example, if the object is the person 80, the processor 150 may determine that the perspective should be a view that captures the face 222 of the person 80. The method and/or criteria for determining the perspective for capturing video of the detected object may be varied according to the design criteria of a particular implementation.

Next, the method 600 may move to the step 620. In the step 620, the apparatus 100 may move to the location that provides the selected perspective. For example, the apparatus 100 may move around furniture to capture a view of a person that captures the face 222. In the step 622, the processor 150 may initiate a video stream comprising dewarped video frames of the detected object captured from the selected perspective. Next, the method 600 may move to the step 624. The step 624 may end the method 600.

Figure 15:
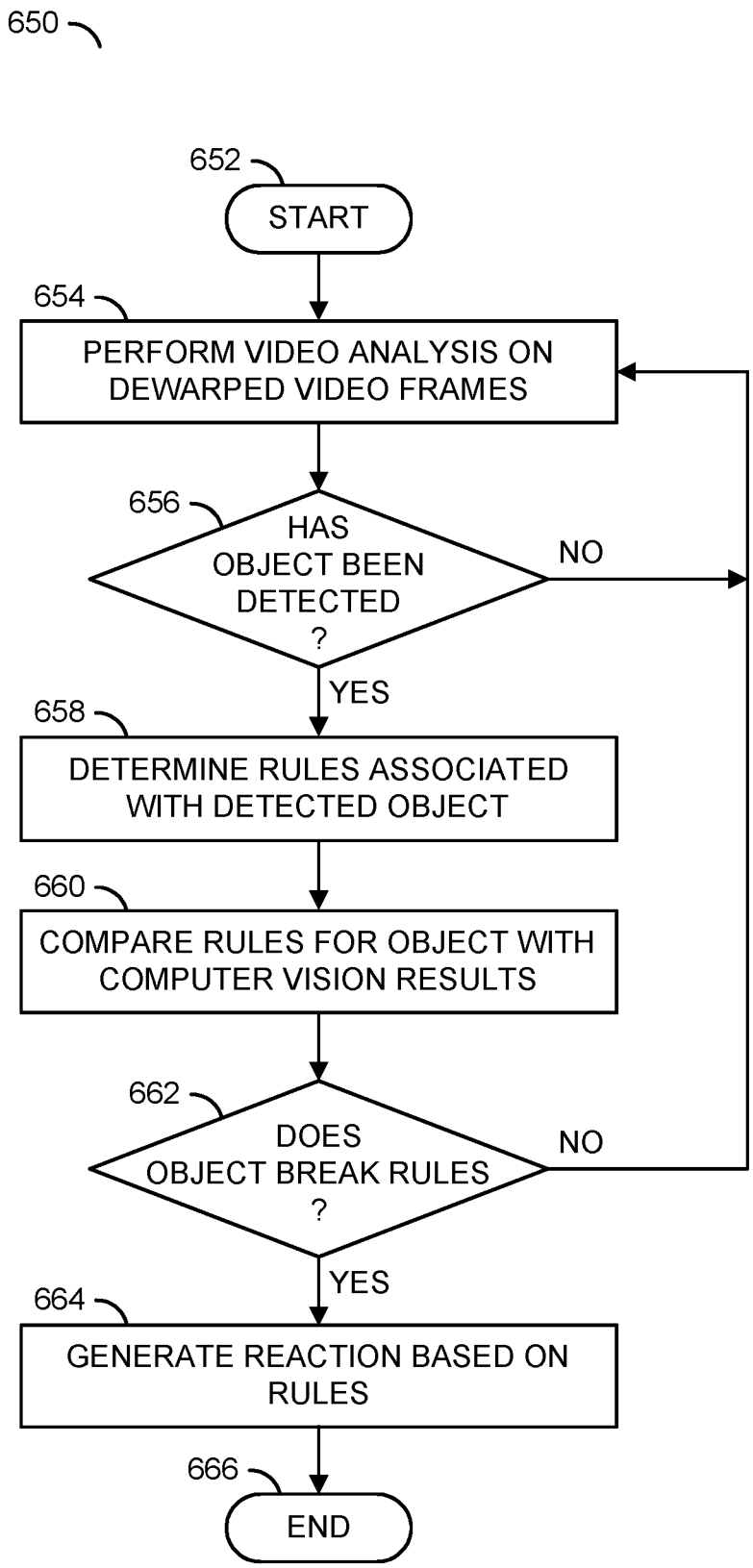
FIG. 15 is a flow diagram illustrating a method for determining a reaction in response to rules.

Referring to FIG. 15, a method (or process) 650 is shown. The method 650 may determine a reaction in response to rules. The method 650 generally comprises a step (or state) 652, a step (or state) 654, a decision step (or state) 656, a step (or state) 658, a step (or state) 660, a decision step (or state) 662, a step (or state) 664, and a step (or state) 666.

The step 652 may start the method 650. In the step 654 the processor 150 may perform the video analysis (e.g., the computer vision operations) on the dewarped video frames. Next, the method 650 may move to the decision step 656. In the decision step 656, the processor 150 may determine whether an object has been detected. If an object has not been detected, the method 650 may return to the step 654. If an object has been detected, the method 650 may move to the step 658.

In the step 658, the processor 150 may determine rules associated with the detected object. The rules for particular objects and/or groups/classes of objects may be stored by the memory 156. In one example, if the object is the cat 310 the memory 156 may retrieve rules for a group of common objects such as pets and/or rules specific to the cat 310. In another example, if the object is the person 80, then the processor 150 may perform the facial recognition operations 224 in order to retrieve rules specific to the person 80. Next, in the step 660, the processor 150 may compare the rules for the detected object with the computer vision results. In one example, if the detected object is a person and the rules indicate that the person is not supposed to be in a particular room, the processor 150 may determine if the computer vision operations indicate that the person is in the particular room. In another example, if the detected object is the cat 310 and the rules indicate that the cat 310 is not allowed on the couch 58, the processor 150 may determine if the computer vision operations indicate that the cat 310 is on the couch 58. The types of rules and/or how the rules are applied to the detected object may be varied according to the design criteria of a particular implementation.

Next, the method 650 may move to the decision step 662. In the decision step 662, the processor 150 may determine whether the detected object breaks the rules associated with the object. If the rules are not broken, then the method 650 may return to the step 654. If the rules are broken, then the method 650 may move to the step 664. In the step 664, the processor 150 may generate a reaction based on the rules. For example, if the detected person is determined to improperly be within a particular room, the processor 150 may communicate a notification to the remote device 332 (e.g., intruder alert). In another example, if the detected cat 310 is improperly on the couch 58, then the reaction may be generating the signal DIR_AOUT to playback a sound from the speakers 104a-104n. Next, the method 650 may move to the step 666. The step 666 may end the method 650.

Figure 16:
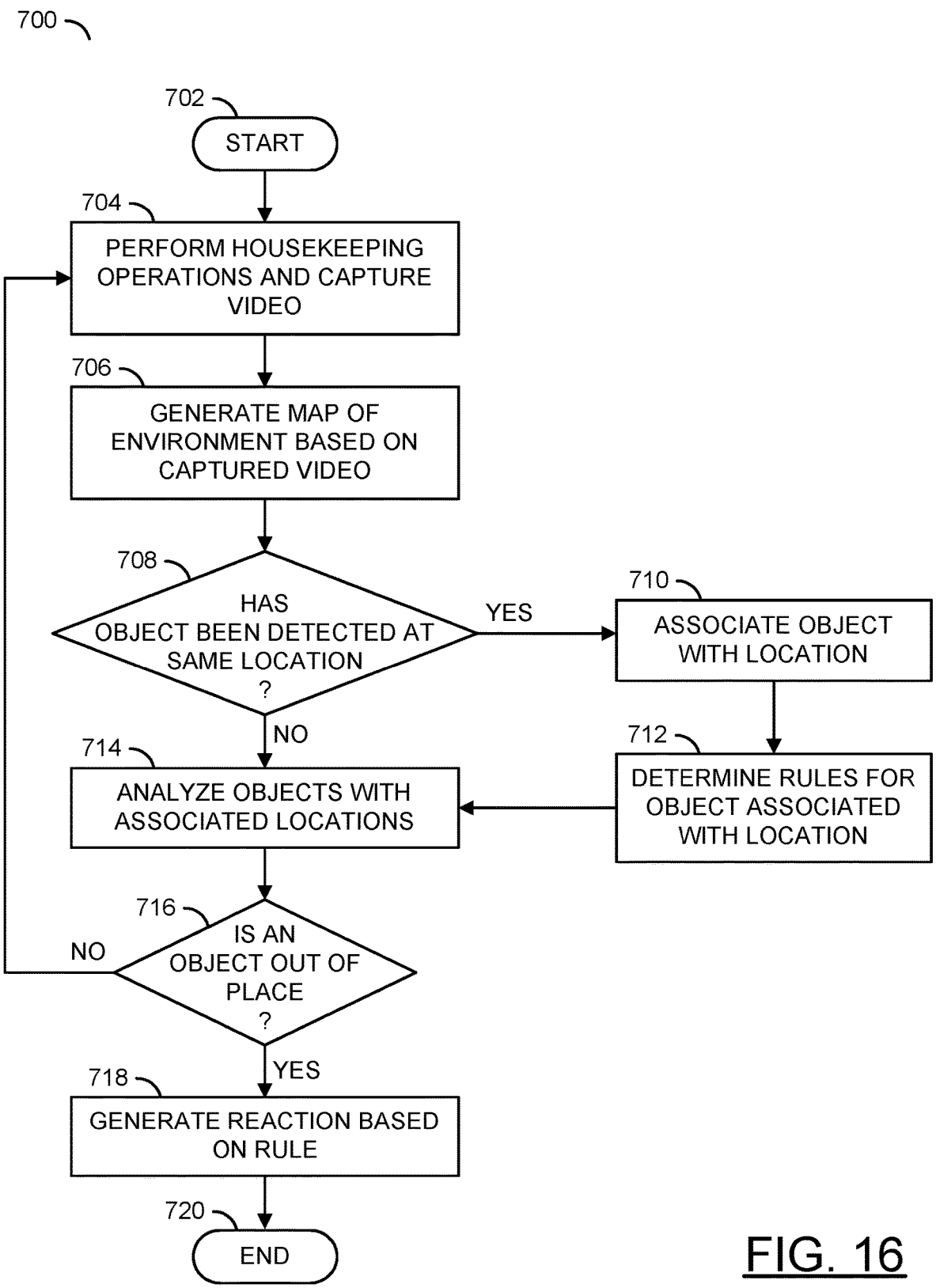
FIG. 16 is a flow diagram illustrating a method for mapping an environment to detect out of place objects.

Referring to FIG. 16, a method (or process) 700 is shown. The method 700 may map an environment to detect out of place objects. The method 700 generally comprises a step (or state) 702, a step (or state) 704, a step (or state) 706, a decision step (or state) 708, a step (or state) 710, a step (or state) 712, a step (or state) 714, a decision step (or state) 716, a step (or state) 718, and a step (or state) 720.

The step 702 may start the method 700. In the step 704, the apparatus 100 may perform the housekeeping operations and capture the video data. Next, in the step 706, the processor 150 may generate a map of the environment based on the captured video. For example, the apparatus 100 may repeatedly travel through the same rooms and capture video and detect objects while performing the housekeeping operations. Based on the captured video and detected objects, the processor 150 may map out the environment and the objects in the environment and the map may be stored in the memory 156. Next, the method 700 may move to the decision step 708.

In the decision step 708, the processor 150 may determine whether a particular object has been detected at the same location. For example, as the apparatus 100 performs the housekeeping operations and travels repeatedly through various rooms, the clock 422 may be detected multiple times on the table 426. If the particular object has been detected multiple times at (or near) the same location, then the method 700 may move to the step 710. In the step 710, the processor 150 may update the stored map to associate the detected object with the location. The objects and the associated location may be stored as part of the map (e.g., the map may be continually updated). Next, in the step 712, the processor 150 may determine rules for the object associated with the location. For example, the rules may comprise location relationships (e.g., the clock 422 is on the table 426 and not under the table 426). In another example, the rules may comprise group rules (e.g., inanimate objects do not belong on the floor). In yet another example, the rules may comprise specific rules provided by the user via the signal INS (e.g., the homeowner may specify that the cat 310 is allowed on the floor 52 but not the couch 58). Next, the method 700 may move to the step 714.

In the decision step 708, if the object has not been detected at the same location, the object may be ignored (or stored to determine if the object is detected on a next visit to the same location) and the method 700 may move to the step 714. In the step 714, the processor 150 may analyze objects with respect to the associated locations as the apparatus 100 travels through the environment performing the housekeeping operations. Next, the method 700 may move to the decision step 716.

In the decision step 716, the processor 150 may determine if the object is out of place. For example, the processor 150 may detect objects and compare the location of the objects detected with the locations from the map stored in the memory 156. For example, if an object that is supposed to be on the table 426 is no longer on the table then the detected object would not match the location stored in the map. If the object is out of place, the method 700 may return to the step 704. If the object is out of place, then the method 700 may move to the step 718. In the step 718, the processor 150 may generate a reaction based on the rules associated with the object being out of place. For example, the reaction may be to generate a warning signal (e.g., an audible beep, a notification to the remote device 332, a video stream with metadata indicating what was detected, etc.). Next, the method 700 may move to the step 720. The step 720 may end the method 700.

The functions performed by the diagrams of FIGS. 1-16 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art (s). Appropriate software, firmware, coding, routines, instructions, opcodes, microcode, and/or program modules may readily be prepared by skilled programmers based on the teachings of the disclosure, as will also be apparent to those skilled in the relevant art (s). The software is generally executed from a medium or several media by one or more of the processors of the machine implementation.

The invention may also be implemented by the preparation of ASICS (application specific integrated circuits), Platform ASICS, FPGAs (field programmable gate arrays), PLDs (programmable logic devices), CPLDs (complex programmable logic devices), sea-of-gates, RFICS (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art (s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMS (erasable programmable ROMS), EEPROMS (electrically erasable programmable ROMs), UVPROMS (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art (s) would understand that the elements of the invention may be implemented in other types of devices to meet the criteria of a particular application.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a video capture device (i) comprising a lens mounted to a housing at a low position with respect to a floor level and (ii) configured to generate pixel data having warping caused by a field of view of said lens; and
a processor configured to (i) process said pixel data arranged as video frames that capture said field of view upward from said low position, (ii) reverse effects of said warping of said pixel data captured caused by said field of view of said lens to generate dewarped frames from said video frames, (iii) detect objects in said dewarped frames, (iv) extract data about said objects based on characteristics of said objects, (v) perform path planning in response to said data extracted and (vi) generate a video stream based on said dewarped frames, wherein
(a) said path planning is used to move said apparatus to a new location,
(b) said apparatus performs autonomous movement, and
(c) reversing said effects of said warping enables said dewarped frames to provide a rectilinear perspective based on said field of view upward from said low position.

2. The apparatus according to claim 1, wherein said rectilinear perspective is configured to allow said objects to be viewed without a geometric distortion of said warping.

3. The apparatus according to claim 1, wherein said rectilinear perspective comprises adjusted visual content that enables accurate and reliable facial detection by said processor.

4. The apparatus according to claim 3, wherein said processor is further configured to crop a size of said dewarped frames to a location of said objects in order reduce a calculation time by performing said facial detection on said location of said objects instead of performing said facial detection on an entire size of said dewarped frames.

5. The apparatus according to claim 1, further comprising a dewarping module implemented as hardware within said processor, wherein said dewarping module is configured to correct said warping caused by lens characteristics of said lens.

6. The apparatus according to claim 5, wherein implementing said dewarping module as said hardware within said processor enables said effects of said warping to be reversed in near real-time.

7. The apparatus according to claim 5, wherein implementing said dewarping module as said hardware within said processor enables calculations used to reverse said effects of said warping to be performed faster than a software implementation.

8. The apparatus according to claim 5, further comprising a microphone configured to capture audio input, wherein implementing said dewarping module as said hardware within said processor enables said audio input to be associated with a location of an audio source detected as one of said objects.

9. The apparatus according to claim 1, wherein (i) said warping of said pixel data captured caused by said lens comprises a key-stoning effect and (ii) reversing said key-stoning effect comprises straightening said video frames in order to narrow a wide distortion at a bottom of said video frames and widen a narrow distortion at a top of said video frames to normalize various shapes in said video frames.

10. The apparatus according to claim 1, wherein said apparatus is configured to implement an autonomous robotic vacuum cleaner.

11. An apparatus comprising:
a capture device (i) mounted to said apparatus at a low position with respect to a floor level and (ii) configured to generate pixel data comprising warping caused by a field of view of said capture device; and
a processor configured to (i) process said pixel data comprising warping as an image that captures said field of view upward from said low position, (ii) perform operations to (a) generate a dewarped image from said image to create a dewarped image signal and (b) detect an object in said dewarped image, (iii) extract data about said object based on characteristics of said object determined using said operations, (iv) perform path planning in response to said data extracted and (v) generate an output signal based on said dewarped image, wherein
(a) said operations generate said dewarped image to correct a geometric distortion effect of said warping caused by generating said pixel data upward from said low position,
(b) said path planning is used to move said apparatus to a new location, and
(c) said apparatus performs autonomous movement.

12. The apparatus according to claim 11, wherein said apparatus is configured to implement an autonomous robotic vacuum cleaner.

13. The apparatus according to claim 12, wherein (i) said output signal is generated to enable surveillance and (ii) apparatus is configured to combine a first functionality of said autonomous robotic vacuum cleaner and a second functionality of said surveillance.

14. The apparatus according to claim 12, wherein (i) said apparatus further comprises (a) a motor configured to suck in debris and (b) a container for storing said debris and (ii) said processor is further configured to control movement by said apparatus.

15. The apparatus according to claim 11, wherein said path planning is performed to enable said apparatus to (i) avoid said object and (ii) move throughout an area to said new location.

16. The apparatus according to claim 11, wherein said capture device comprises a stereo pair of cameras.

17. The apparatus according to claim 11, wherein said capture device comprises a wide angle fisheye lens configured to (i) capture a wide angle field of view, (ii) detect said object in a near-field to avoid obstacles and (iii) detect said object at long range for surveillance.

18. The apparatus according to claim 11, further comprising a wireless communication device configured to communicate said output signal to a remote device, wherein (i) said wireless communication device is further configured to receive instructions from said remote device and (ii) said instructions enable manual control of movement of said apparatus by a user.

19. The apparatus according to claim 11, wherein said processor is further configured to (i) detect a person based on said data extracted, (ii) select a window of interest for said dewarped image corresponding to said person, (iii) perform said operations to generate a high resolution image of said window of interest and (iv) perform facial recognition operations on said high resolution image.

20. An apparatus comprising:
a video capture device (i) mounted at a low position and (ii) configured to generate warped pixel data that captures a field of view upward from said low position;
speakers configured to playback audio messages; and
a processor configured to (i) process said warped pixel data arranged as input video frames, (ii) perform video operations to (a) generate dewarped frames from said input video frames and (b) detect objects in said dewarped frames, (iii) extract data about said objects based on characteristics of said objects determined using said video operations, (iv) perform path planning in response said data extracted and (v) generate a video stream based on said dewarped frames, wherein
(a) said video operations generate said dewarped frames to correct a distortion effect caused by capturing said input video frames from said low position,
(b) said path planning is used to move said apparatus to a new location,
(c) said apparatus is capable of autonomous movement, and
(d) said audio messages are played back in response to said data extracted.

* * * * *